US011132498B2

(12) United States Patent
Yang et al.

(10) Patent No.: US 11,132,498 B2
(45) Date of Patent: Sep. 28, 2021

(54) PORTABLE DEVICE AND METHOD FOR CONTROLLING CURSOR OF PORTABLE DEVICE

(71) Applicant: Samsung Electronics Co., Ltd., Gyeonggi-do (KR)

(72) Inventors: Seul-Ae Yang, Seoul (KR); Ji-Won Baek, Yongin-si (KR); Chul-Woo Kim, Gyeonggi-do (KR); Min-Jung Moon, Gyeonggi-do (KR); Ha-Young Jeon, Seoul (KR); Won-Heui Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/310,019

(22) PCT Filed: Jun. 14, 2017

(86) PCT No.: PCT/KR2017/006164
§ 371 (c)(1),
(2) Date: Dec. 14, 2018

(87) PCT Pub. No.: WO2018/008863
PCT Pub. Date: Jan. 11, 2018

(65) Prior Publication Data

US 2019/0332659 A1 Oct. 31, 2019

(30) Foreign Application Priority Data

Jul. 5, 2016 (KR) ........................ 10-2016-0085020

(51) Int. Cl.
*G06F 3/01* (2006.01)
*G06F 40/166* (2020.01)
(Continued)

(52) U.S. Cl.
CPC ............ *G06F 40/166* (2020.01); *G06F 3/017* (2013.01); *G06F 3/03547* (2013.01);
(Continued)

(58) Field of Classification Search
CPC .... G06F 17/24; G06F 3/04883; G06F 3/0482; G06F 3/03547; G06F 3/017;
(Continued)

(56) References Cited

U.S. PATENT DOCUMENTS

2010/0029255 A1 2/2010 Kim et al.
2010/0153879 A1 6/2010 Rimas-Ribikauskas et al.
(Continued)

FOREIGN PATENT DOCUMENTS

DE 20 2016 001 845 U1 8/2016
EP 2 930 597 A2 10/2015
(Continued)

OTHER PUBLICATIONS

European Search Report dated Jul. 18, 2019.
European Search Report dated May 28, 2019.

*Primary Examiner* — Jonathan A Boyd
(74) *Attorney, Agent, or Firm* — Cha & Reiter, LLC

(57) ABSTRACT

Provided are a portable device and a method for controlling a cursor of the portable device. More specifically, disclosed are a portable device and a method for controlling a cursor of the portable device, by which a cursor that is displayed by using a first pressure touch (or successive motions of the first pressure touch) is controlled. Some of the disclosed embodiments provide a portable device and a method for controlling a cursor of the portable device, by which a cursor that is displayed by using a first touch and a first pressure touch (or successive motions of the first pressure touch) is controlled.

15 Claims, 26 Drawing Sheets

(51) Int. Cl.

*G06F 3/0354* (2013.01)
*G06F 3/0482* (2013.01)
*G06F 3/0488* (2013.01)

(52) U.S. Cl.

CPC ........ *G06F 3/0482* (2013.01); *G06F 3/04883* (2013.01); *G06F 2200/1637* (2013.01); *G06F 2203/04808* (2013.01)

(58) Field of Classification Search

CPC ... G06F 2203/04808; G06F 2200/1637; G06F 3/0481; G06F 3/04842; G06F 3/04886

See application file for complete search history.

(56) References Cited

U.S. PATENT DOCUMENTS

| | | | | |
|---|---|---|---|---|
| 2010/0162178 | A1 | 6/2010 | Tuli | |
| 2012/0127086 | A1* | 5/2012 | Li | G06F 3/0482 345/173 |
| 2013/0215018 | A1* | 8/2013 | Xu | G06F 3/0488 345/157 |
| 2015/0268854 | A1 | 9/2015 | Kim et al. | |
| 2015/0277748 | A1* | 10/2015 | Shin | G06F 3/041 715/773 |
| 2015/0324116 | A1 | 11/2015 | Marsden et al. | |
| 2016/0274761 | A1* | 9/2016 | Alonso Ruiz | G06F 3/04886 |

FOREIGN PATENT DOCUMENTS

| | | | | |
|---|---|---|---|---|
| KR | 10-2010-0015126 | A | 2/2010 | |
| KR | 10-2015-0062883 | A | 6/2015 | |
| KR | 10-2015-0109755 | A | 10/2015 | |
| WO | 2015/199292 | A1 | 12/2015 | |
| WO | WO-2015199292 | A1 * | 12/2015 | G06F 3/033 |

* cited by examiner

PORTABLE DEVICE AND METHOD FOR CONTROLLING CURSOR OF PORTABLE DEVICE

CROSS-REFERENCE TO RELATED APPLICATIONS

This application is a U.S. National Stage application under 35 U.S.C. § 371 of an International application filed on Jun. 14, 2017 and assigned application number PCT/KR2017/006164, which claimed the benefit of a Korean patent application filed on Jul. 5, 2016 in the Korean Intellectual Property Office and assigned Serial number 10-2016-0085020, the entire disclosure of which is hereby incorporated by reference.

TECHNICAL FIELD

The following embodiments relate to portable devices and methods for controlling cursors on portable devices, and more specifically, to portable devices with a pressure touch region, which can control a displayed cursor corresponding to combinations of single touches, single pressure touches, single pressure touch gestures, multi-pressure touches, and multi-pressure touch gestures, and to methods for controlling cursors on portable devices.

BACKGROUND ART

The development of technology affords portable devices various services and functionalities via a diversity of applications, including not only calling or data transmission, but also other types of multitasking.

Portable devices receive inputs made by users, e.g., button clicks, touches (or touch gestures) on touch panel, a voice command entered through a microphone, and motions detected by a sensor. A user may enter text to the screen or move the cursor displayed on the screen by way of a keypad (or keys shown thereon) displayed on part of the screen.

DETAILED DESCRIPTION OF THE INVENTION

Technical Problem

A need exists for a method for moving and editing a cursor using a keypad (or keys on the keypad) displayed on the screen.

Technical Solution

According to an embodiment of the present invention, a method for controlling a cursor on a portable device comprises detecting a first pressure touch on an input region of an application screen displayed on the portable device, wherein the application screen includes the input region including a soft key and a display region displaying the cursor and a sentence including text, displaying a pressure touch region corresponding to the detected first pressure touch, detecting the continuous movement of the first pressure touch, and moving the position of the cursor from syllable to syllable in a previous line or from syllable to syllable in a next line, corresponding to the direction of the continuous movement of the first pressure touch, wherein the text includes syllables and words separated by spaces.

According to an embodiment of the present invention, in moving the position of the cursor, when the direction of the continuous movement of the first pressure touch is an upward direction, the cursor position may be moved from word to word in the previous line, and when the direction of the continuous movement of the first pressure touch is a downward direction, the cursor position may be moved from word to word in the next line.

According to an embodiment of the present invention, the pressure touch region may be overlaid on the input region.

According to an embodiment of the present invention, the application screen may further include a word suggestion region, and a suggested word corresponding to the cursor position moving corresponding to the continuous movement of the first pressure touch may be displayed on the word suggestion region.

According to an embodiment of the present invention, the method may further comprise releasing the first pressure touch off the pressure touch region and detecting a second pressure touch, detecting the continuous movement of the second pressure touch, and moving the cursor from word to word in the previous line or from word to word in the next line, corresponding to a direction of the continuous movement of the second pressure touch.

According to an embodiment of the present invention, a method for controlling a cursor on a portable device comprises detecting a first pressure touch on an input region of an application screen displayed on the portable device, wherein the application screen includes the input region including a soft key and a display region displaying the cursor and a sentence including text, displaying a pressure touch region corresponding to the detected first pressure touch, detecting a first touch on the pressure touch region, detecting the continuous movement of the first pressure touch, and displaying text selected in highlight corresponding to the detected continuous movement of the first pressure touch from the current cursor position corresponding to the detected first touch.

According to an embodiment of the present invention, a portable device comprises a pressure sensor, a touchscreen configured to display an application screen, and a processor configured to control the pressure sensor and the touchscreen, wherein the processor is configured to perform a control to detect a first pressure touch on an input region including a soft key as a portion of the application screen by using the pressure sensor, display the pressure touch region on a portion of the application screen corresponding to the detected first pressure touch, and move the position of the cursor from syllable to syllable in a previous line or from syllable to syllable in a next line, corresponding to the direction of a continuous movement of the first pressure touch on a display region that displays text and the cursor as a portion of the application screen.

Advantageous Effects

According to the present invention, there may be provided a portable device that has a pressure touch region and that moves a cursor displayed on the application screen using a pressure touch (or a continuous movement of a pressure touch) entered to the pressure touch region, as well as a method for controlling a cursor on the portable device.

According to the present invention, there may be provided a portable device having a sensor that detects the tilt of the portable device and a pressure touch region and that moves a cursor displayed on the application screen using the direction of the tilt of the portable device and a pressure touch (or a continuous movement of a pressure touch)

entered to the pressure touch region, as well as a method for controlling a cursor on the portable device.

There may be provided a portable device that has a pressure touch region and that allows displayed text to be selected using a pressure touch (or a continuous movement of a pressure touch) entered to the pressure touch region, as well as a method for controlling a cursor on the portable device.

Without being limited thereto, according to various embodiments of the present invention, there may be provided a portable device controlling a cursor displayed on a display region corresponding to combinations of single touches, single pressure touches, single pressure touch gestures, multi-pressure touches, and multi-pressure touch gestures, as well as a method for controlling a cursor on the portable device.

MODE FOR CARRYING OUT THE INVENTION

Figure 1A:
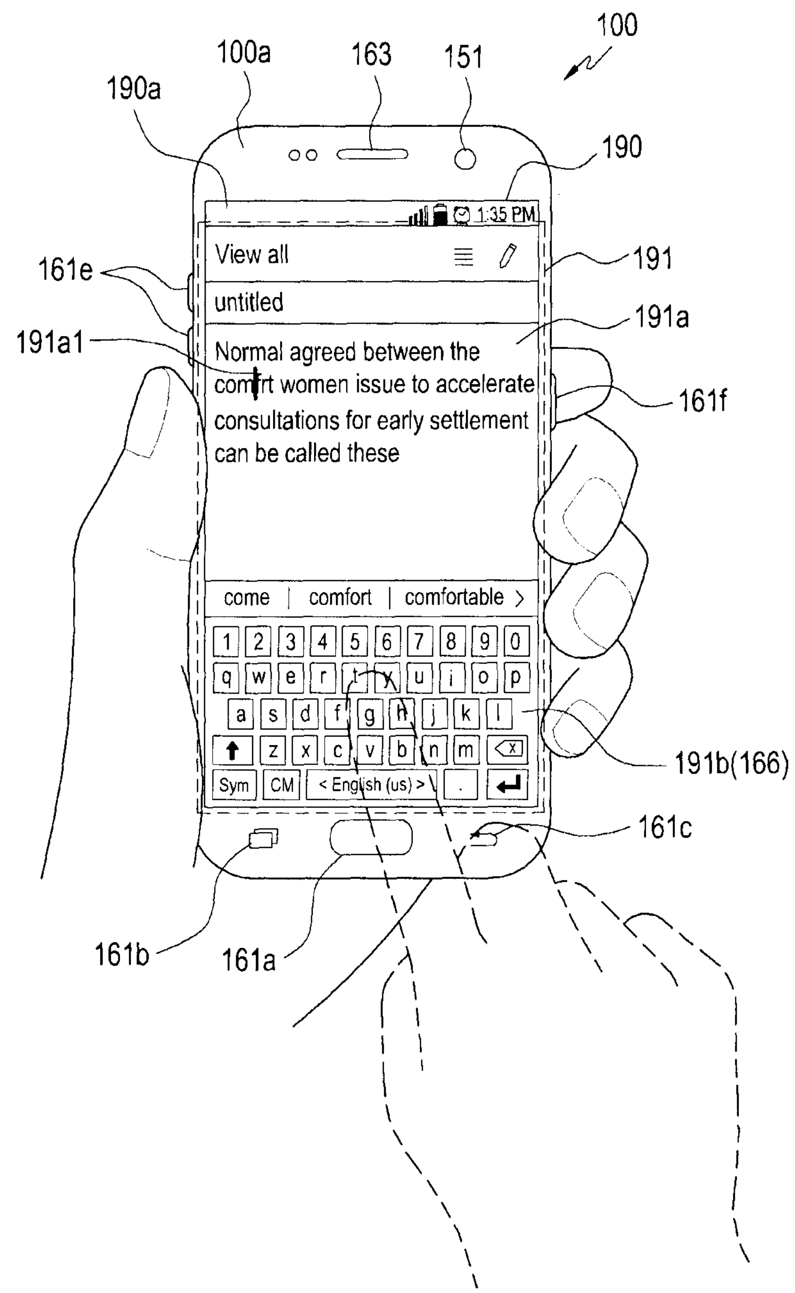
FIGS. 1*a* and 1*b* are views schematically illustrating a portable device according to an embodiment of the present invention.

Hereinafter, exemplary embodiments of the present invention are described in detail with reference to the accompanying drawings. Hereinafter, exemplary embodiments of the present invention are described in detail with reference to the accompanying drawings. The same reference numbers in each figure denote parts or components that perform substantially the same function.

The terms coming with ordinal numbers such as 'first' and 'second' may be used to denote various components, but the components are not limited by the terms. The terms are used only to distinguish one component from another. For example, "first component" as used herein may also be denoted as "second component." "Second component" may also be denoted as "first component." The term "and/or" may denote a combination(s) of a plurality of items as listed or any of the items.

According to embodiments of the present invention, "application" means software that is executed on a computer operating system (OS) or mobile OS and is used by a user. Examples of an application may include web browsers, camera applications, mobile payment applications (or electronic payment applications, payment applications), photo album applications, word processor and spread sheet applications, contacts applications, calendar applications, memo applications, alarm applications, social network system (SNS) applications, telephony applications, game stores, game applications, chatting applications, map applications, music player applications, or video players.

According to embodiments of the present invention, "application" may mean software that is executed on a portable device or an external device (e.g., a wearable device or server) wiredly or wirelessly connected with the portable device. According to embodiments of the present invention, "application" may mean software that is executed on a portable device, corresponding to a user input received.

Content may be executed or displayed through an application executed corresponding thereto. Examples of content may include video files or audio files played on video players among applications, game files executed on game applications, music files played on music players, photo files displayed on photo album applications, webpage files displayed on web browsers, or payment information (e.g., mobile card numbers, amounts of payment, product names, service names, or store names) displayed on electronic payment applications. Content may also include call-related screens (e.g., the caller's ID), the caller's name, the talk start time, or the caller's video (or image) on video calling, which is displayed on telephony applications.

Content may include screens of applications being executed and user interfaces constituting the application screens. Content may also include one or more contents.

"Widget" means a miniature application which is one of graphic user interfaces (GUIs) for more smoother support for interactions between user and application or OS. For example, there may be weather widgets, calculator widgets, or clock widgets.

In embodiments of the present invention, "user input" may be termed as encompassing, e.g., the user's choice of a button (or key), the user's press (or click) on a button (or key), the user's touch on a soft button (or soft key), the user's touch (including a contactless one, such as hovering) received (or detected) on touchscreen, the user's touch gesture (including a contactless one, such as hovering) received (or detected) on touchscreen, the user's voice, the user's presence (e.g., when the user appears within the scope recognized by a camera), or the user's motion. "Choice of a button (or key)" may be termed to mean pressing a button (or key) or touching a soft button (or soft key).

The terms as used herein are provided merely to describe some embodiments thereof, but not intended to limit the present invention. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof. The reference numbers in each figure denote members substantially performing the same function.

Figure 1B:
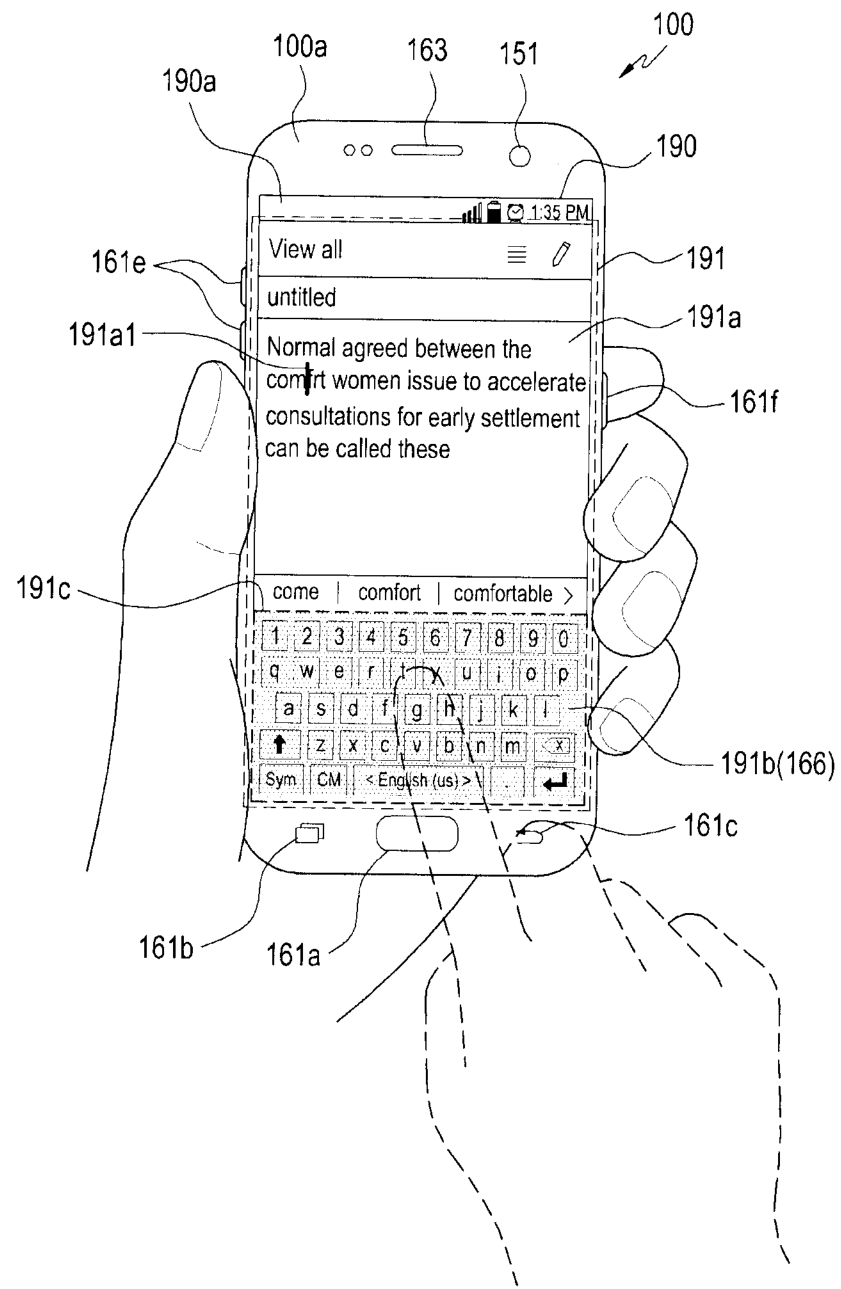

FIGS. 1*a* and 1*b* are views schematically illustrating a portable device according to an embodiment of the present invention.

Referring to FIGS. 1*a* and 1*b*, a portable device 100 has a touchscreen 190 in a central area on the front surface 100*a*. The touchscreen 190 may include a bendable display panel (not shown). The touchscreen 190 may include a touch panel (not shown) corresponding to a bendable display panel (not shown).

The touchscreen 190 may include a main touchscreen 190 and a single edge touchscreen (not shown) or a dual edge touchscreen (not shown) that extends from the main touchscreen 190. In the touchscreen 190, the main touchscreen 190 and the single edge touchscreen (not shown), or the main touchscreen 190 and the dual edge touchscreen (not shown), may be integrally formed with each other.

The touchscreen 190 may be bent or warped through a thin, flexible printed circuit board (not shown).

Referring to FIG. 1*a*, a memo application screen 191 is displayed corresponding to text input to a memo application executed on the touchscreen 190. The memo application screen 191 includes a display region 191*a* and an input region 191*b*. The input region 191*b* may be called a keypad 166 (refer to FIG. 2).

When the user touches a key in the input region 191*b*, text (or a number) input to the touched key is displayed on the display region 191*a*. The user may touch and drag a cursor 191*a*1 displayed on the display region 191*a* or may touch a desired word (or sentence) on the display region 191*a* and move the cursor 191*a*1.

Referring to FIG. 1*b*, when the user firmly touches a soft key (or a blank region between the soft key and another soft key) on the input region 191*b*, a pressure touch region (or a pressure touch keypad or second keypad 191*c*) may be displayed on the input region 191*b*. The pressure touch region 191*c* may be displayed to be distinguished from the input region 191*b* (e.g., by patterns or shadings). The pressure touch region 191*c* may be overlaid on the input region 191*b*.

When the pressure touch region 191*c* is displayed, the user may move the cursor or select a word, sentence, or both using the pressure touch region 191*c*. The user may enter a touch or touch gesture to the pressure touch region 191*c*. The user may enter a single touch, single touch gesture, multiple touches (e.g., a single touch gesture plus a single touch), or multiple touch gestures (e.g., a single touch gesture plus another single touch gesture).

When the pressure touch region 191*c* is displayed, the keys in the input region 191*b* cannot be selected by the overlaid pressure touch region 191*c*.

Home screens (not shown) may be displayed on the touchscreen 190 of the portable device 100. The home screen (not shown) may display shortcut icons (not shown) corresponding to applications selectable by touching (including, e.g., hovering), a weather widget (not shown), and a clock widget (not shown).

The home screen (not shown) may display, at the top, a status bar 190*a* to indicate the status of the portable device 100, such as the battery charging status, strength of received signal, and current time. The home screen (not shown) of the portable device may be positioned under the status bar 190*a*, or the home screen (not shown) alone may be displayed without the status bar 190*a* being displayed.

Figure 2:
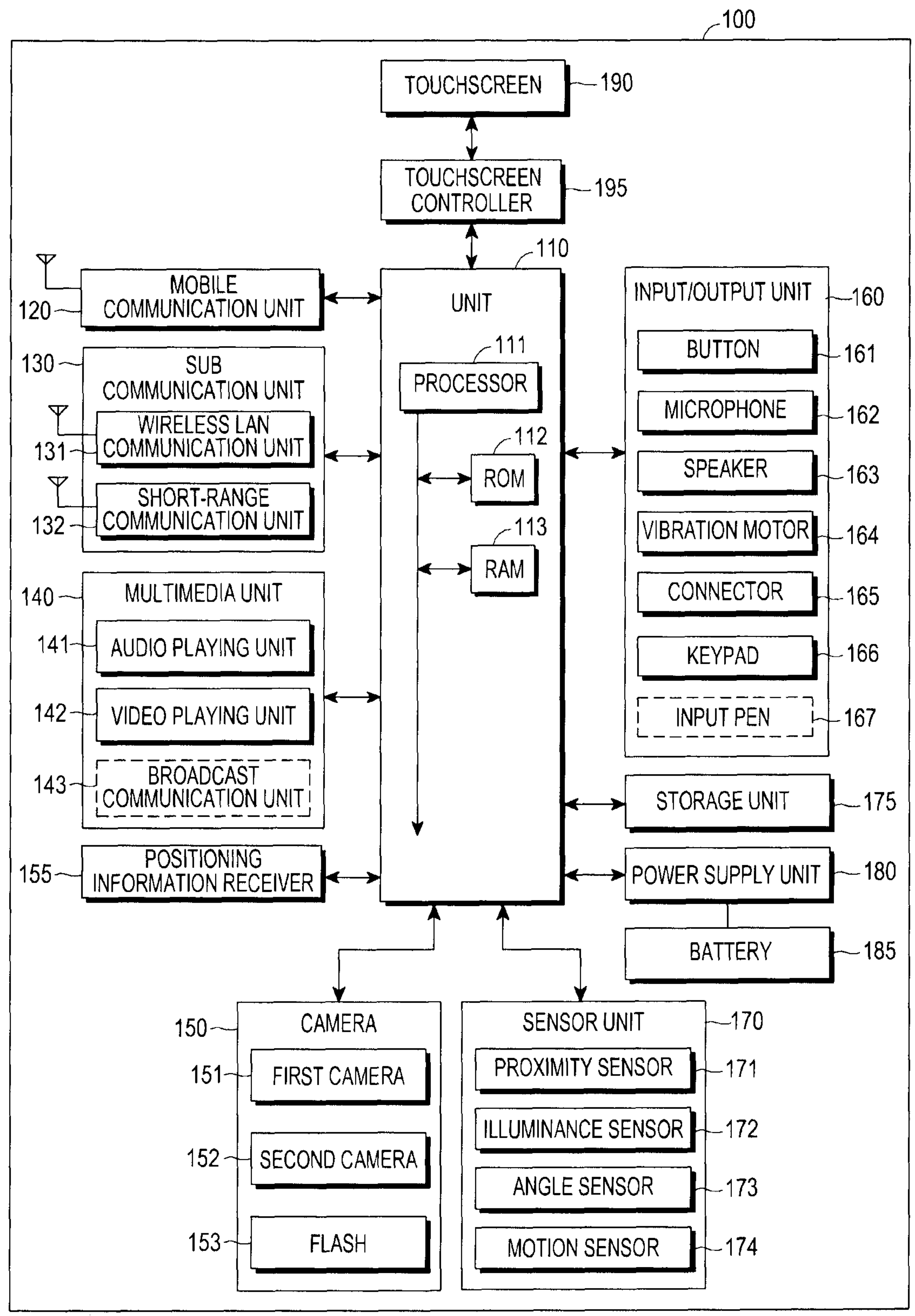
FIG. 2 is a block diagram schematically illustrating a portable device according to an embodiment of the present invention.

At the top of the front surface 100*a* of the portable device 100 may be positioned a first camera 151, one or more speakers 163, an illuminance sensor 171, and a proximity sensor 172 (refer to FIG. 2). The portable device 100 may have a second camera 152 (refer to FIG. 2) and a flash 153 (refer to FIG. 2) on the back surface (not shown).

At the bottom of the front surface 100*a* of the portable device 100 are positioned a home button 161*a*, a recently run app button 161*b*, and a return button 161*c*. Buttons 161 may be implemented not only as physical buttons (e.g., the home button 161*a*, power/lock button 161*d*, and volume buttons 161*e*) but also as touch buttons (e.g., the home button 161*a*, recently run app button 161*b*, and return button 161*c*). The buttons 161 may be displayed alongside text or other icons in the touchscreen 190.

The power/lock button 161*d* and volume buttons 161*e* may be positioned on the side surface of the portable device 100. The side surface of the portable device 100 may connect the front surface 100*a* and back surface of the portable device 100 and may include a left side surface, a right side surface, a top surface, and a bottom surface.

One or more microphones 162 (refer to FIG. 2) may be positioned on the top, side, and/or bottom of the portable device 100. A connector 165 and/or a speaker 163 may be positioned on the top, side, and/or bottom of the portable device 100. An insertion hole (not shown) for in input pen 167 (refer to FIG. 2) with buttons (not shown) may be positioned on the top or bottom of the portable device 100. The input pen 167 (refer to FIG. 2) may be stored through the insertion hole (not shown) in the portable device 100 and may be pulled out of the portable device for use.

FIG. 2 is a block diagram schematically illustrating a portable device according to an embodiment of the present invention.

Referring to FIGS. 1*a* to 2, the portable device 100 may functionally connect to another device (e.g., another portable device (not shown)) or a server (not shown) by way of at least one of a mobile communication unit 120, a sub communication unit 130, and a connector 165.

The portable device 100 may have a touchscreen 190 and may transmit or receive data to/from the outside through the communication unit 120 or 130. The portable device 100 may have an input pen 167 and a touchscreen 190 and may transmit or receive data to/from the outside through the communication unit 120 or 130.

The portable device 100 includes a controller 110, a mobile communication unit 120, a sub communication unit 130, a multimedia unit 140, cameras 150, a positioning information receiver 155, an input/output unit 160, a sensor unit 170, a storage unit 175, and a power supply unit 180. The portable device also includes a touchscreen 190 and a touchscreen controller 195.

The controller 110 may include a processor 111. The controller 110 may further include a ROM 112 storing a control program to control the portable device 100 and RAM 113 used to store signals or data input from the outside of the portable device or as a storage region for various tasks performed on the portable device 100.

The controller 110 performs functions to process data and to control the overall operation of the portable device 100 and signal flows between internal components 110 to 195 of the portable device 100. The controller 110 controls the supply of power to the internal components (120 to 195) using the power supply unit 180.

The processor 111 may include a graphic processing unit (not shown) for graphic processing. The processor 111 may further include a sensor processor (not shown) to control sensors or a communication processor (not shown) for controlling communications.

The processor 111 may be implemented in the form of a system on chip (SoC) including a core (not shown) and a GPU (not shown). The processor 111 may be a single-core, dual-core, triple-core, or quad-core processor or a processor including more multiple cores.

The processor, ROM 112, and RAM 113 may be interconnected via a bus.

The controller 110 may control the mobile communication unit 120, the sub communication unit 130, the multimedia unit 140, the cameras 150, the positioning information receiver 155, the input/output unit 160, the sensor unit 170, the storage unit 175, the power supply unit 180, the touchscreen 190, and the touchscreen controller 195.

According to embodiments of the present invention, the term "controller of portable device" may encompass the processor 111, ROM 112, and RAM 113. The term "controller of portable device" may mean the processor 111.

The mobile communication unit 120 may connect to other devices (e.g., other portable devices (not shown)) or servers (not shown) via a mobile communication network using one or more antennas under the control of the controller 110.

The sub communication unit 130 may connect to other devices (e.g., other portable devices (not shown)) or servers (not shown) via the wireless LAN communication unit 131 and/or short-range communication unit 132 using one or more antennas under the control of the controller 110. The sub communication unit 130 may include antennas for wireless LAN, antennas for magnetic secure transmission (MST) or NFC communication antennas for electronic payment.

The wireless LAN communication unit 131 may wirelessly connect to access points (APs) in the place where the APs are installed under the control of the controller 110. The wireless LAN communication unit 131 may support, e.g., wireless LAN communications.

The short-range communications may include, e.g., Bluetooth communications, Bluetooth low energy (BLE) communications, infrared data association (IrDA) communications, ultra-wideband (UWB) communications, magnetic secure transmission (MST) controllers, and/or NFC communications.

The portable device 100 may include one or a combination of the mobile communication unit 120, the wireless LAN communication unit 131, and the short-range communication unit 132.

According to various embodiments of the present invention, the term "communication unit" may encompass the mobile communication unit 120 and/or the sub communication unit 130.

The multimedia unit 140 may play audio or video and/or receive broadcasts from the outside under the control of the controller 110.

An audio playing unit 141 may play, via an audio codec under the control of the controller 110, audio sources (e.g., audio files with file extensions, e.g., mp3, wma, ogg, or way) pre-stored in the storage unit 175 of the portable device 100 or received from the outside.

According to various embodiments of the present invention, the audio playing unit 141 may play the auditory feedback corresponding to a change in the position of the cursor displayed in the display region by a continuous movement of a pressure touch (or an additional touch and a continuous movement of the pressure touch). For example, the audio playing unit 141 may play, through the audio codec under the control of the controller 110, the auditory feedback (e.g., the output of an audio source stored in the storage unit 175) corresponding to a change in the position of the cursor displayed in the display region by a continuous movement of a pressure touch (or an additional touch and a continuous movement of the pressure touch).

A video playing unit 142 may play, via a video codec under the control of the controller 110, digital video sources (e.g., video files with file extensions, e.g., mpeg, mpg, mp4, avi, mov, or mkv) pre-stored in the storage unit 175 of the portable device 100 or received from the outside.

According to various embodiments of the present invention, the video playing unit 142 may play the visual feedback corresponding to a change in the position of the cursor displayed in the display region by a continuous movement of a pressure touch (or an additional touch and a continuous movement of the pressure touch). For example, the visual feedback (e.g., the output of a video source stored in the storage unit 175) may be played via the video codec under the control of the controller 110.

A broadcast communication unit 143 may receive broadcast signals (e.g., TV broadcast signals, radio broadcast signals, or data broadcast signals) and broadcast additional information (e.g., electronic program guide (EPG) or electronic service guide (ESG)) from external broadcast stations through an antenna (not shown) under the control of the controller 110.

The multimedia unit 140 may include the audio playing unit 141 and the video playing unit 142, except for the broadcast communication unit 143, corresponding to the performance or structure of the portable device 100. The controller 110 may be implemented to include at least one of the audio playing unit 141 and the video playing unit 142 of the multimedia unit 140.

The cameras 150 may capture still images or videos under the control of the controller 110. The cameras 150 include a first camera 151 on the front surface and a second camera 152 on the back surface. The first camera 151 or the second camera 152 may include an auxiliary light source (e.g., the flash 153) to provide light necessary for photographing.

The cameras 150 may include the first camera 151 on the front surface of the portable device 100 and an additional camera (e.g., a third camera (not shown)) adjacent the first camera 151 (e.g., the interval in optical axis between the first camera 151 and the additional camera is larger than 5 mm and smaller than 80 mm) The cameras 150 may include the first camera 151 and the third camera (not shown) implemented in a single unit. The controller 110 may capture three-dimensional still images or three-dimensional videos using the first camera 151 and the third camera (not shown).

The cameras 150 may include the second camera 152 on the back surface of the portable device 100 and an additional camera (e.g., a fourth camera (not shown)) adjacent the second camera 152 (e.g., the interval in optical axis between the second camera 152 and the additional camera is larger than 5 mm and smaller than 80 mm) The cameras 150 may include the second camera (not shown) and the fourth camera (not shown) implemented in a single unit. The controller 110 may capture three-dimensional still images or three-dimensional videos using the second camera 152 and the fourth camera (not shown).

The cameras 150 may take wide-angle shots, telescopic shots, or close shots using an additional lens (not shown) detachable from a separate adapter (not shown).

The positioning information receiver 155 periodically receives signals (e.g., GPS satellite trajectory information, satellite time information, and navigation messages) from a plurality of satellites around the earth.

The portable device 100 may calculate the position of the portable device 100 and each satellite (not shown) using signals received from the plurality of satellites and calculate the distance using time differences in transmission/reception. The position, time, or moving speed of the portable device 100 may be calculated using triangulation. An additional satellite may be needed for trajectory correction or time correction.

Indoors, the portable device 100 may detect the position or moving speed of the portable device 100 using wireless APs (not shown). Indoors, the position of the portable device 100 may be detected using a cell-ID scheme, an enhanced cell-ID scheme, or an angle-of-arrival (AoA) scheme. The portable device 100 may detect the position or moving speed of the portable device 100 which is positioned indoors using wireless beacons (not shown).

The input/output unit 160 may include at least one of one or two or more buttons 161, one or two or more microphones 162, one or two or more speakers 163, one or two or more vibration motors 164, a connector 165, a keypad 166, and an input pen 167.

Referring to FIGS. 1*a* to 2, the buttons 161 may include a home button 161*a*, a recently run app button 161*b*, and/or a return button 161*c* positioned at the bottom on the front surface of the portable device 100. The buttons 161 may include one or more volume buttons 161*d* and a power/lock button 161*e* on a side surface of the portable device 100. The buttons 161 may be implemented only with the home button 161*a*, volume buttons 161*d*, and power/lock button 161*e*.

Some (e.g., 161*a*, 161*b*, 161*c*, or other buttons) of the buttons 161 may be implemented as physical buttons or touch buttons. Some (161*a*, 161*b*, and 161*c*) of the buttons 161 may be displayed as text, images, or icons on the touchscreen 190.

The controller 110 may receive electrical signals from the buttons 161 corresponding to reception of user inputs. The controller 110 may detect user inputs using received signals (e.g., pressing the buttons 161).

The description of the shapes, positions, functions, and names of the buttons 161 shown in FIGS. 1*a* to 2 merely amount to examples, and it would readily be appreciated by one of ordinary skill in the art that various changes, modifications, or variations can be made thereto without being limited thereto.

The microphone 162 produces voices or sounds received from the outside into electrical signals under the control of the controller 110. The electrical signals produced by the microphone 162 may be converted by the audio codec under the control of the controller 110 and may be stored in the storage unit 175 or output through the speaker 163.

Referring to FIGS. 1*a* to 2, one or two or more microphones 162 may be positioned on the front, side, and/or back surface of the portable device 100.

The speaker 163 outputs sounds corresponding to various signals (e.g., wireless signals, broadcast signals, audio sources, video files, or photographing) decoded by the audio codec under the control of the controller 110.

Referring to FIGS. 1*a* to 2, one or more speakers 163 may be positioned on the front, side, and/or back surface of the portable device 100. A plurality of speakers (not shown) may be positioned on the side surface of the portable device 100.

According to an embodiment of the present invention, the speaker 163 may output the auditory feedback corresponding to a change in the position of the cursor displayed in the display region by a continuous movement of a pressure touch (or an additional touch and a continuous movement of the pressure touch). For example, the speaker 163 may output the auditory feedback corresponding to a change in the position of the cursor displayed in the display region by a continuous movement of a pressure touch (or an additional touch and a continuous movement of the pressure touch) under the control of the controller 110.

The vibration motor 164 converts electrical signals into mechanical vibrations under the control of the controller 110. The vibration motor 164 may include linear vibration motors, bar-type vibration motors, coin-type vibration motors, or piezoelectric element vibration motors.

One or two or more vibration motors 164 may be positioned inside the portable device 100. The vibration motor 164 may vibrate the whole portable device 100 or may locally vibrate only part of the portable device 100.

According to an embodiment of the present invention, the vibration motor 164 may output the tactile feedback corresponding to a change in the position of the cursor displayed in the display region by a continuous movement of a pressure touch (or an additional touch and a continuous movement of the pressure touch). The vibration motor 164 may provide various tactile feedbacks (e.g., the strength and duration of vibration) pre-stored or received from the outside based on control commands from the controller 110.

The connector 165 may be used as an interface to connect the portable device 100 with an external device (not shown) or a power source (not shown). For example, the connector 165 may include micro USB-type connectors or USB-C type connectors.

The keypad 166 receives user inputs for controlling the portable device 100. The keypad 166 may have buttons (or keys) and include one of a virtual keypad 191*b* displayed on the touchscreen 190, a pressure touch keypad 191*c* corresponding to pressure (or force) applied by a user input, and a physical keypad (not shown) positioned at the bottom on the front surface of the portable device 100.

When the user firmly touches (e.g., enough to exceed a threshold) a key in the input region 191*b*, a pressure sensor (including, e.g., an electrode (or electrode layer) capable of detecting pressure applied—not shown) may be positioned at the bottom of the input region 191*b* to detect pressure applied to the input region 191*b*. When the pressure sensor (not shown) detects a pressure exceeding the threshold (e.g., 50% of voltage (or current) or 50% of capacitance varied by touch entered to the input region 191*b*), the controller 110 may perform a control to execute the pressure touch keypad 191*c* overlaid on the input region 191*b*.

The above-described threshold, capacitance, and/or voltage (or current) are merely examples, and it would easily be appreciated by one of ordinary skill in the art that changes may be made thereto (e.g., changes may be made to the threshold or detectable capacitance) depending on the structure and/or functionality of the portable device 100.

The keypad 166 may further include a separate keypad (or a keyboard (not shown)) connectable wiredly or via short-range communications.

The input pen 167 may be put in or pulled out through the side surface of the portable device 100. The user may use the input pen 167 to choose (or touch) objects (e.g., menus, text, images, videos, shapes, icons, and shortcut icons) and/or content (e.g., text files, image files, audio files, video files, payment information, or webpages) constituting (or displayed on) the touchscreen 190 or a notetaking/drawing application screen (e.g., a memo screen, notepad screen, or calendar screen) displayed on the touchscreen 190 or to handwrite, draw, paint, or sketch.

The sensor unit 170 may detect the state of the portable device 100 and/or the status (e.g., the tilt (or angle) or shake) of the portable device 100 through one or more sensors.

The sensor unit 170 may include a proximity sensor 171 for detecting whether the user approaches the portable device 100, an illuminance sensor 172 for detecting the amount of light around the portable device 100, an angle sensor 173 for detecting the tilt (or angle) of the portable device 100, or a motion sensor 174 for detecting the motion of the portable device 100.

At least one of the proximity sensor 171 and the illuminance sensor 172 may be positioned on the front surface of the portable device 100.

The sensor 173 (or a tilt sensor) for detecting tilt may detect the signal (e.g., current, voltage, or resistance) corresponding to the tilt of the portable device 100 grabbed by the user. The sensor 173 for detecting tilt may convert detected signals and transfer the converted signals to the controller 110. The controller 110 may calculate angles from 0° to 360° with respect to the three axes (e.g., X, Y, and Z axes). Further, the sensor 173 for detecting tilt may be implemented as an acceleration sensor (not shown), a geomagnetic sensor (not shown), or a gyro sensor (not shown).

The motion sensor 174 may detect the signal (e.g., current, voltage, or resistance) corresponding to the shaking of the portable device 100 caused by the user. The motion sensor 174 may convert the detected signal and transfer the converted signal to the controller 110. The motion sensor 174 may be implemented as an acceleration sensor, a geomagnetic sensor, or a gyro sensor.

A fingerprint sensor (not shown) may be positioned in a physical button (e.g., the home button or a separate physical button) positioned on the front surface of the portable device 100 or a separate physical button (not shown) positioned on the back surface of the portable device 100. The fingerprint sensor may be positioned in a portion of the touchscreen 190 (e.g., a region adjacent the home button 161*a* and inside the touchscreen 190—not shown) in order to scan the user's fingerprint.

The sensor unit 170 may further include a gravity sensor (not shown) or an altimeter (not shown). The sensor unit 170 may further include a biometric signal sensor (not shown) with a heartrate sensor (not shown).

The sensors in the sensor unit 170 detect the user's status (e.g., body temperature, heartrate, or brain wave) and the status of the portable device 100, produce electrical signals corresponding to the detection, and transmit the electrical signals to the controller 110. It would easily be appreciated by one of ordinary skill in the art that sensors may be added, modified, or deleted from the sensor unit 170 depending on the performance of the portable device 100.

The storage unit 175 may store signals or data input/output corresponding to the operation of the components 110 to 195 under the control of the controller 110. The storage unit 175 may store a control program for controlling the portable device 100 or the controller 110, graphical user interfaces (GUIs) related to applications downloaded from the outside or received from the manufacturer, images corresponding to the GUIs, user information, documents, databases, or relevant data.

The storage unit 175 may store visual feedbacks (e.g., video sources), which are output corresponding to changes in the position of the cursor displayed on the display region, made by the continuous movement of a pressure touch (or an additional touch and the continuous movement of the pressure touch) and that are recognizable to the user, auditory feedbacks (e.g., sound sources) output from the speaker 163 and that are recognizable to the user, and tactile feedbacks (e.g., haptic patterns) output from the vibration motor 164 and that are recognizable to the user.

The storage unit 175 may store the time (e.g., 500 ms) of feedback provided to the user.

According to embodiments of the present invention, the term "storage unit" encompasses the storage unit 175, the ROM 112 or RAM 113 in the controller 110, or a memory card (e.g., a micro SD card (not shown)) mounted in the portable device 100. The storage unit 175 may include a non-volatile memory, a volatile memory, a hard disk drive (HDD) or a solid state drive (SSD).

The power supply unit 180 may supply power to the components 110 to 195 of the portable device 100 under the control of the controller 110. The power supply unit 180 may supply power, which is fed from an external power source (not shown) connected with the connector 165, to each component of the portable device 100 under the control of the controller 110. The power supply unit 180 may charge one or more batteries 185 under the control of the controller 110.

The power supply unit 180 may supply the power charged in the battery 185 to accessory devices (e.g., a watch (not shown)) via cables. The power supply unit 180 may wirelessly charge other devices (e.g., other portable devices or the accessory device 200) using separate transmission coils (not shown) functionally connected with the battery 185 under the control of the controller 110. The wireless charging schemes may include, e.g., magnetic resonance schemes, electromagnetic wave schemes, or magnetic induction schemes.

The touchscreen 190 may provide the user with graphical user interfaces (GUIs) corresponding to various services (e.g., voice call, video call, data transmission, broadcast reception, photographing, video viewing, or electronic payment including mobile payment). The touchscreen 190 may include a touch panel (not shown) for receiving user inputs (e.g., touches) and a display panel (not shown) for displaying the screen. The touchscreen 190 may include an edge touch panel (not shown) for receiving user inputs and an edge display panel (not shown) for displaying the screen.

The touchscreen 190 may transmit analog signals corresponding to single touch or multi-touch inputs to the home screen 191 or GUI to the touchscreen controller 195. The touchscreen 190 may receive single touch or multi-touch inputs through the user's body part (e.g., the user's thumb or other finger) or the input pen 167.

According to an embodiment of the present invention, the touchscreen 190 may output the visual feedback corresponding to a change in the position of the cursor displayed in the display region by a continuous movement of a pressure touch (or an additional touch and a continuous movement of the pressure touch). According to embodiments of the present invention, "display unit" may mean one including the touchscreen 190.

The touchscreen controller 195 converts analog signals corresponding to single touch (or multi-touch) inputs received from the touchscreen 190 into digital signals and transmits the digital signals to the controller 110. The controller 110 may calculate the position (e.g., X and Y coordinates) of the touch received through the touchscreen 190 using the digital signal received from the touchscreen controller 195.

The controller 110 may control the touchscreen 190 using the digital signal received from the touchscreen controller 195. For example, the controller 110 may display the shortcut icon (or also called an icon) displayed on the touchscreen 190 corresponding to the touch input so that it is differentiated from other non-selected shortcut icons or may execute the application (e.g., a game application) corresponding to the selected shortcut icon to display the game application screen on the touchscreen 190.

It will readily be appreciated by one of ordinary skill in the art that at least one component may be added (e.g., a separate touchscreen added), deleted (e.g., the components denoted in dashed lines in FIG. 2), or modified corresponding to the performance of the portable device 100.

Figure 3:
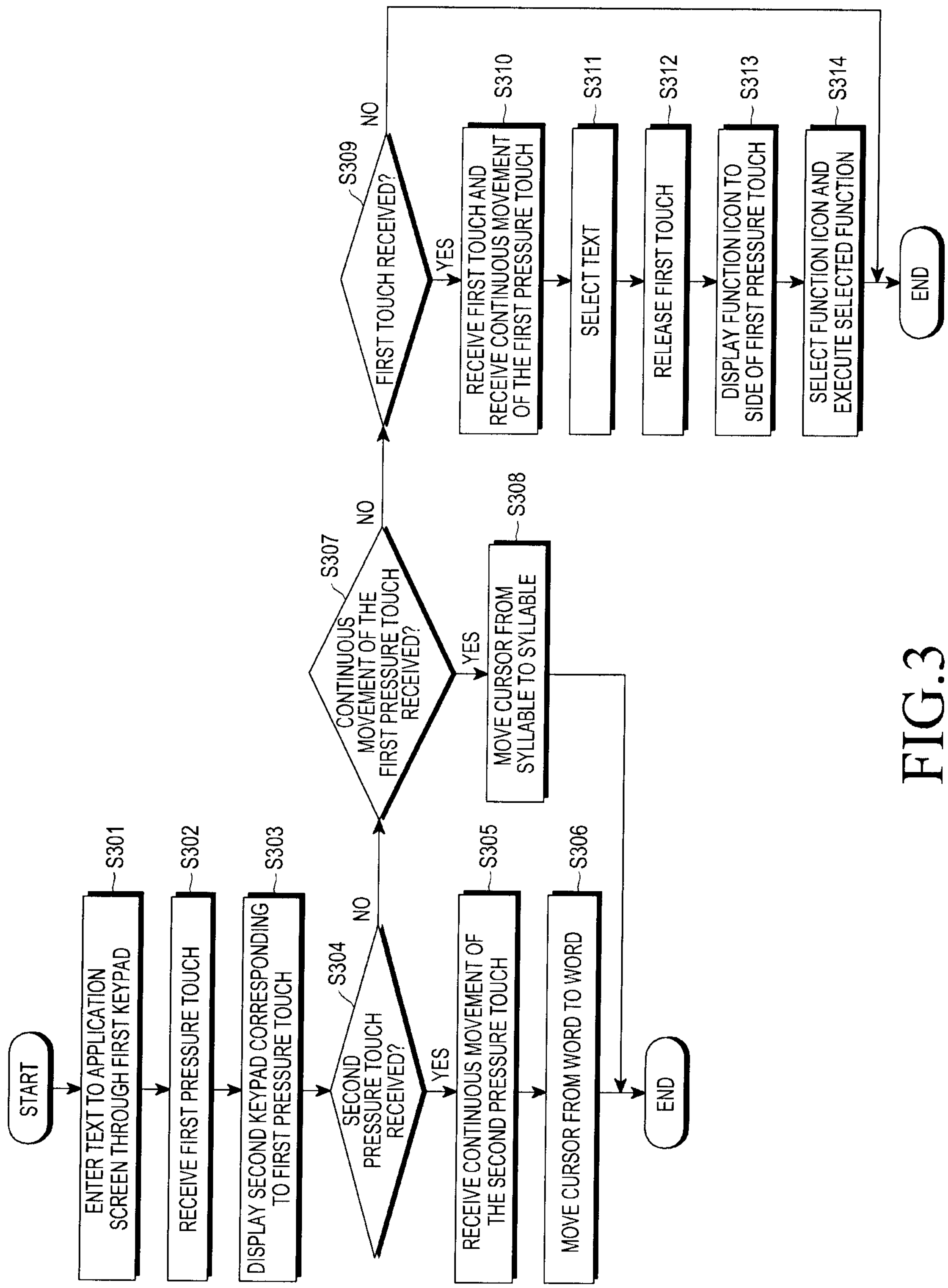
FIG. 3 is a flowchart schematically illustrating a method for controlling a cursor on a portable device according to an embodiment of the present invention.

FIG. 3 is a flowchart schematically illustrating a method for controlling a cursor on a portable device according to an embodiment of the present invention.

FIGS. 4*a* to 4*m* are views illustrating examples of a method for controlling a cursor on a portable device according to an embodiment of the present invention.

Referring to FIG. 3, in step S301, text is entered to the application screen through a first keypad.

Figure 4A:
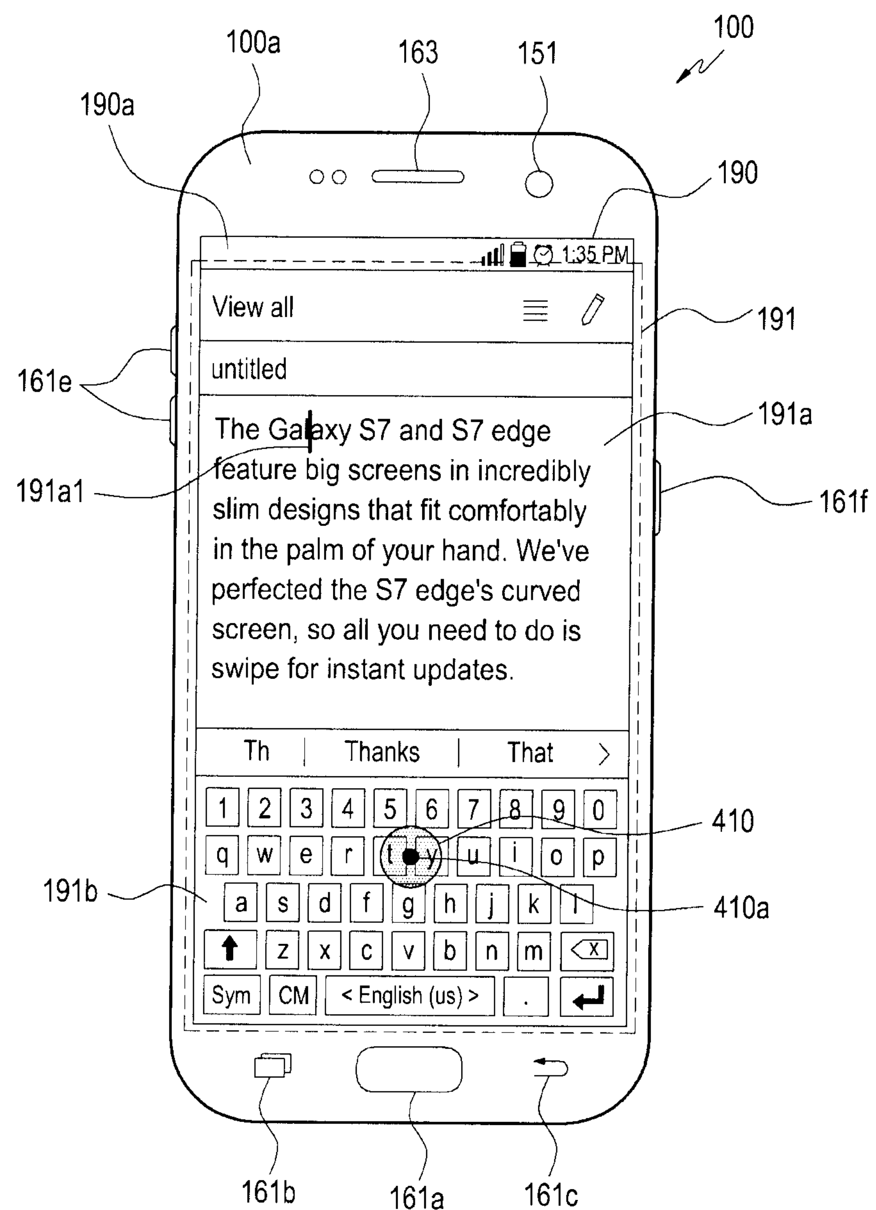
FIGS. 4*a* to 4*m* are views illustrating examples of a method for controlling a cursor on a portable device according to an embodiment of the present invention.

Referring to FIG. 4*a*, a memo application screen 191 is displayed on the touchscreen 190 of the portable device 100. The memo application screen 191 may include a display region 191*a* to display the cursor position 191*a*1 and sentences including entered text (or letters, numbers, or symbols), and an input region 191*b* to receive user inputs through one or more soft keys (or soft buttons) corresponding to the text (or sentences) displayed in the display region 191*a*. The input region 191*b* including the soft keys may be referred to as a keypad 166 or a first keypad 166. The display region 191*a* may include sentences including text and/or a paragraph including one or more sentences.

The user may select a key in the input region 191*b* through a touch (or touch gesture) using their body part and/or the input pen 167 to enter text. The user may also enter text via voice.

Referring to FIG. 3, in step S302, a first pressure touch is received.

Referring to FIG. 4*a*, the user enters a first pressure touch 410 to the input region 191*b*. The first pressure touch 410 may be detected by a pressure sensor (not shown) positioned in the lower end of the input region 191*b*. The lower end of the input region 191*b* may include, e.g., the lower end of the touchscreen 190, inside the touchscreen 190, the lower end of the display panel (not shown), or the upper end of the touch panel (not shown). According to an embodiment of the present invention, the pressure sensor (not shown) may be implemented separate from the touchscreen 190. The pressure sensor (not shown) may be included in the touchscreen 190.

The controller 110 may detect the first pressure touch 410 on the second keypad 191*c* by using the touchscreen 190 and the touchscreen controller 195. Further, the controller 110 may detect the first pressure touch 410 on the second keypad 191*c* by using the second keypad 191*c*, the touchscreen 190, and/or the touchscreen controller 195.

The controller 110 may calculate the first pressure touch position 410*a* (e.g., coordinates X11 and Y11) corresponding to the first pressure touch 410 detected in the input region 191*b* by using the electrical signal received from the touchscreen controller 195.

The pressure of the first pressure touch 410 may be detected by the pressure sensor (not shown). The pressure sensor may transmit an electrical signal (e.g., a voltage ranging from 0V to 3V, which varies depending on portable devices) corresponding to the pressure entered to the controller 110. The controller 110 may calculate the pressure using the received electrical signal. The controller 110 may also map the pressure using the received electrical signal.

The controller 110 may store, in the storage unit 175, first pressure touch information corresponding to, e.g., the first pressure touch position 410*a*, the time of detection of the first pressure touch (e.g., 10:06 AM), the pressure value of the first pressure touch, and the electrical signal corresponding to the first pressure touch. The first pressure touch 410 may be created by, e.g., a thumb, other finger, or the input pen 167.

Referring to FIG. 3, in step S303, the second keypad corresponding to the first pressure touch is displayed.

Figure 4B:
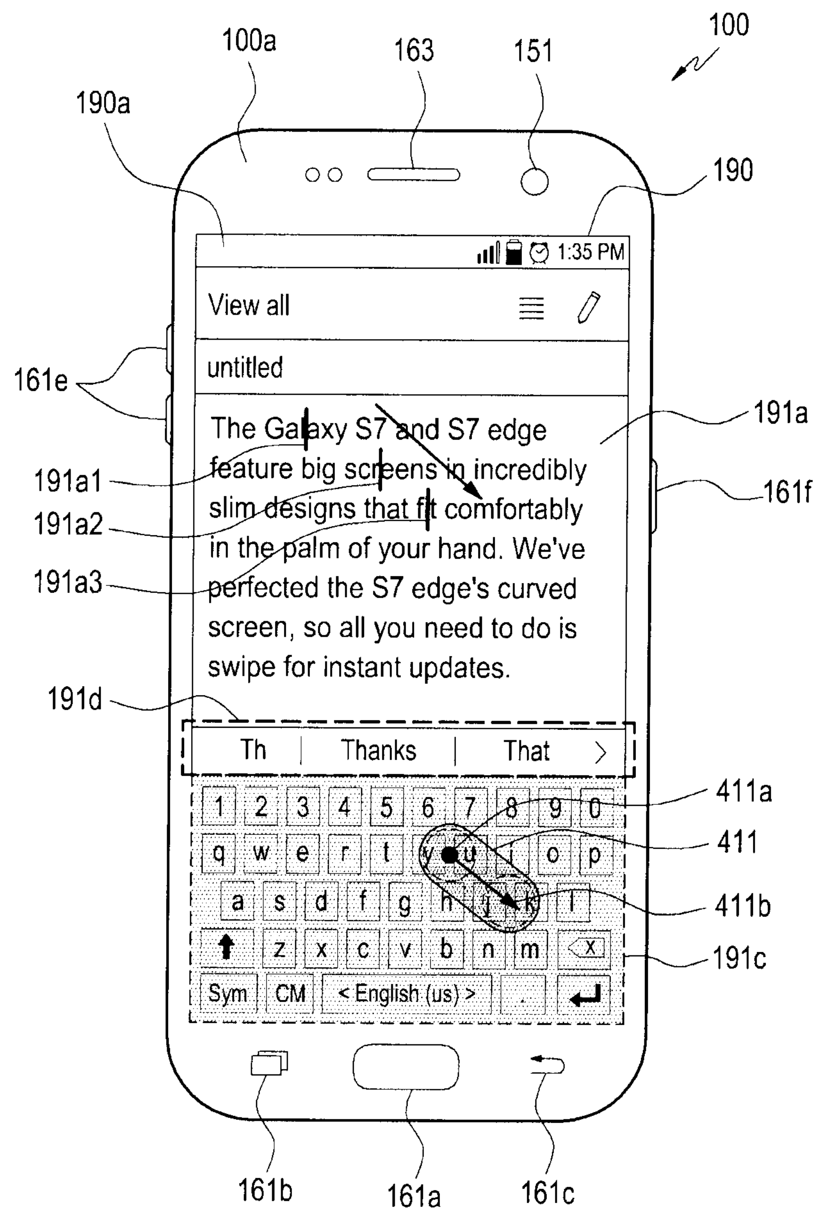

Referring to FIG. 4*b*, the controller 110 performs a control to display the second keypad 191*c* corresponding to the detected first pressure touch. The second keypad 191*c* may be overlaid on the input region 191*b* or may be displayed to be distinguished from the input region 191*b*. The second keypad 191*c* may be transparent (or invisible) and may be overlaid on the input region 191*b*.

Pressure touches, such as the first pressure touch 410, and normal touches, such as a first touch 420 (refer to FIG. 4*d*), may be entered through the second keypad 191*c*.

When the second keypad 191*c* is displayed, soft key entry through the input region 191*b* may be restricted. For example, when the user chooses a soft key (e.g., 'number 8'), the user's soft key choice on the second keypad 191*c* may be restricted (entry is unavailable).

The area of the second keypad 191*c* may be 20% larger or smaller than the area of the input region 191*b*. When the second keypad 191*c* is larger in area than the input region 191*b*, a portion of the second keypad 191*c* may be overlaid on the display region 191*a*. When the second keypad 191*c* is larger in area than the input region 191*b*, a portion of the second keypad 191*c* may be overlaid on a word suggestion region 191*d*.

Since the area of the input region 191*b* is variable depending on the area of the touchscreen 190, the area of the second keypad 191*c* is also variable depending on the area of the touchscreen 190 of the portable device 100.

Referring to FIG. 3, in step S304, a second pressure touch is received.

Referring to FIG. 4*b*, the user enters the second pressure touch 411 to the second keypad 191*c*. Like the first pressure touch 410, the second pressure touch 411 may be detected by a pressure sensor (not shown) positioned in the lower end of the input region 191*b*.

The controller 110 may calculate the second pressure touch position 411*a* (e.g., coordinates X12 and Y12) corresponding to the second pressure touch 411 detected in the second keypad 191*c* using the touchscreen 190 and the touchscreen controller 195.

Receiving the second pressure touch 411 in step S304 of FIG. 3 is substantially similar to receiving the first pressure touch 410 in step S302 of FIG. 3 (e.g., reception through the second keypad or reception through the input region), and thus, no repetitive description is presented.

The controller 110 may store, in the storage unit 175, second pressure touch information corresponding to, e.g., the second pressure touch position 410*a*, the time of detecting the second pressure touch (e.g., 10:07 AM), the pressure value of the second pressure touch, and the electrical signal corresponding to the second pressure touch. The second pressure touch 411 may be created by, e.g., a thumb, other finger, or the input pen 167.

When the second pressure touch is received in step S304 of FIG. 3, the process goes to step S305 of FIG. 3. Unless the second pressure touch is received in step S304 of FIG. 3, the process goes to step S307 of FIG. 3.

In step S305 of FIG. 3, a continuous movement of the second pressure touch is received.

Referring to FIG. 4*b*, the user enters the continuous movement of the second pressure touch 411.

The controller 110 may detect (or calculate) the continuous movement (e.g., a plurality of X coordinates and Y coordinates corresponding to the continuous touch) of the second pressure touch 411 detected from the second keypad 191*c* using the touchscreen 190 and the touchscreen controller 195. Position information corresponding to the continuous movement of the second pressure touch 411 may be stored in the storage unit 175 under the control of the controller 110.

The continuous movement (e.g., from the first position 411*a* to the last position 411*b*) of the second pressure touch 411 on the second keypad 191*c* may mean a touch gesture entered to the second keypad 191c. The touch gesture on the second keypad 191c may include a swipe, drag, or flick with the position 411a of the second pressure touch 411 as the first position.

The continuous movement (e.g., from the first position 411a to the last position 411b) of the second pressure touch 411 on the second keypad 191c may mean that contact is continuously maintained in the direction indicated by the arrow from the first position 411a on the second keypad 191c to the last position 411b. In the last position 411b of the continuous movement, the contact between the second pressure touch 411 and the second keypad 191c (or the touchscreen 190) may be released ("touch-off"). The direction of the continuous movement of the second pressure touch 411 may be one of upward, downward, left, and right directions.

The continuous movement (e.g., from the first position 411a to the last position 411b) of the second pressure touch 411 on the second keypad 191c may be made in a straight line or curve. For example, the user may make the continuous movement (e.g., from the first position 411a to the last position 411b) of the second pressure touch 411 with a finger of their right or left hand (or an input pen) while holding the portable device 100 in the other hand.

According to an embodiment of the present invention, the pressure of the second pressure touch 411 may be the same as or different from the pressure of the continuous movement of the second pressure touch 411. For example, the user may maintain the pressure of the second pressure touch 411 to enter the continuous movement (from 411a to 411b). The user may make the second pressure touch 411 at a first pressure and enter the continuous movement (from 411a to 411b) at a second pressure (e.g., the first pressure the second pressure).

According to an embodiment of the present invention, the "continuous movement of touch" may include a plurality of touches, and the above-described two touch positions 411a and 411b are merely an example; however, embodiments of the present invention are not limited thereto. It would readily be appreciated by one of ordinary skill in the art that the number of touches included in the continuous movement of touch may differ (e.g., variable depending on the resolution of the touchscreen 190).

In step S306 of FIG. 3, the cursor moves from word to word.

Referring to FIG. 4b, the controller 110 may continuously move the cursor position 191a1 (to, e.g., 191a1 through 191a3) displayed on the display region 191a, corresponding to the continuous movement of the second pressure touch 411.

The controller 110 may move the cursor position 191a1, which is displayed on the display region 191a, from word to word (e.g., to 191a1 through 191a3) in the next line, corresponding to the direction of the continuous movement of the second pressure touch 411. Further, the controller 110 may continuously move the cursor position 191a1, which is displayed on the display region 191a, from word to word in the next line, corresponding to maintaining the continuous movement of the second pressure touch 411.

When the continuous movement (from 411a to 411b) of the second pressure touch is directed downwards (e.g., towards the home button, which varies depending on the orientation (portrait or landscape) of the portable device 100 in FIG. 4a), the cursor position 191a1 may be moved (e.g., to 191a1 through 191a3) from word to word in the next line. When the continuous movement (from 411b to 411a) of the second pressure touch is directed upwards (e.g., towards the first camera, which varies depending on the orientation (portrait or landscape) of the portable device 100 in FIG. 4a), the cursor position 191a1 may be moved (e.g., to 191a3 through 191a1) from word to word in the previous line.

The controller 110 may stop moving the cursor position 191a3 displayed on the display region 191a, corresponding to the continuous movement of the second pressure touch 411 stopping (e.g., upon touching off in the last position 411b).

According to an embodiment of the present invention, "movement of cursor position" may have the same meaning as "movement of cursor." "Movement of current cursor position" may have the same meaning as "movement of current cursor."

The controller 110 may provide the user with the feedback corresponding to the movement of the cursor position on the display region 191a by the continuous movement of the second pressure touch 411.

The controller 110 may provide one of visual feedback, auditory feedback, and tactile feedback. The controller 110 may provide the user with combinations of visual feedback, auditory feedback, and tactile feedback.

The visual feedback may include a visual effect (e.g., an animation effect, such as a separate image or fading applied to a separate image—not shown) corresponding to the movement of the cursor position on the display region 191a by the continuous movement of the second pressure touch 411. The controller may display the visual feedback on the touchscreen 190.

The auditory feedback may include a sound corresponding to the movement of the cursor position on the display region 191a by the continuous movement of the second pressure touch 411. The controller 110 may output the auditory feedback through the speaker 163. The controller 110 may output the auditory feedback through one or more speakers.

The tactile feedback may include a vibration corresponding to the movement of the cursor position on the display region 191a by the continuous movement of the second pressure touch 411. The controller 110 may output the tactile feedback through the vibration motor 164. When there is a plurality of vibration motors 164, the controller 110 may selectively output the tactile feedback through one of the plurality of vibration motors.

The time (e.g., 500 ms) of providing feedback to the user may be varied through settings (not shown). At least one of a plurality of feedbacks (e.g., visual feedback, auditory feedback, and tactile feedback) provided may be selected corresponding to the movement of the cursor position on the display region 191a by the continuous movement of the second pressure touch 411.

In step S306 of FIG. 3, when the cursor moves from word to word, the method for controlling the cursor on the portable device is terminated.

Unless the second pressure touch is received back in step S304 of FIG. 3, the process goes to step S307 of FIG. 3.

In step S307 of FIG. 3, a continuous movement of the first pressure touch is received.

Figure 4C:
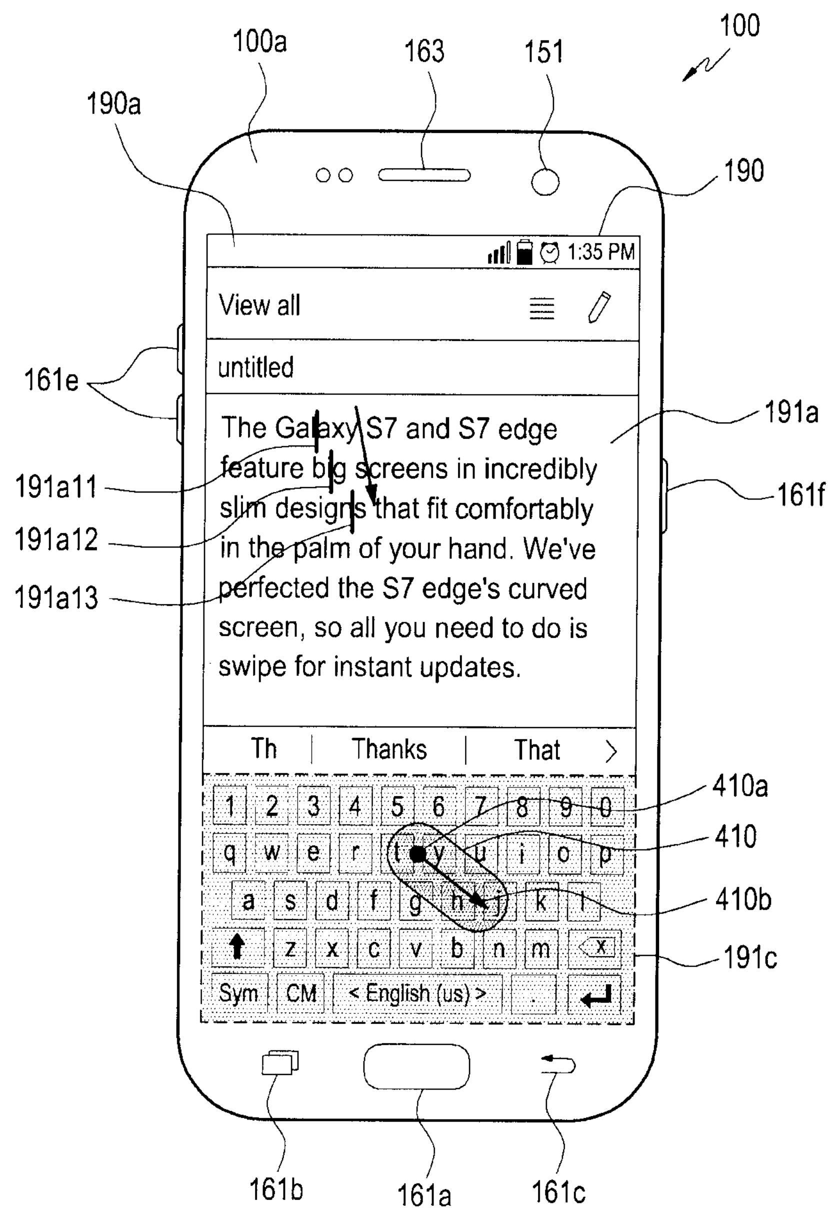

Referring to FIG. 4c, the user enters the continuous movement of the first pressure touch 410.

The controller 110 may detect (or calculate) the continuous movement (e.g., a plurality of X coordinates and Y coordinates corresponding to the continuous touch) of the first pressure touch 410 detected from the second keypad 191c by using the touchscreen 190 and the touchscreen controller 195. Position information corresponding to the continuous movement of the first pressure touch 410 may be stored in the storage unit 175 under the control of the controller 110.

The continuous movement (e.g., from the first position 410*a* to the last position 410*b*) of the first pressure touch 410 on the second keypad 191*c* may mean a touch gesture entered to the second keypad 191*c*. The touch gesture on the second keypad 191*c* may include a swipe, drag, or flick with the position 410*a* of the first pressure touch 410 as the first position.

The continuous movement (e.g., from the first position 410*a* to the last position 410*b*) of the first pressure touch 410 on the second keypad 191*c* may mean that contact is continuously maintained in the direction indicated by the arrow from the first position 410*a* on the second keypad 191*c* to the last position 410*b*. In the last position 410*b* of the continuous movement, the contact between the first pressure touch 410 and the second keypad 191*c* (or the touchscreen 190) may be released ("touch-off").

The continuous movement (e.g., from the first position 410*a* to the last position 410*b*) of the first pressure touch 410 on the second keypad 191*c* may be made in a straight line or curve. For example, the user may make the continuous movement (e.g., from the first position 410*a* to the last position 410*b*) of the first pressure touch 410 with a finger of their right or left hand (or an input pen) while holding the portable device 100 in the other hand.

According to an embodiment of the present invention, the pressure of the first pressure touch 410 may be the same as or different from the pressure of the continuous movement of the first pressure touch 410. For example, the user may maintain the pressure of the first pressure touch 410 to enter the continuous movement (from 410*a* to 410*b*). The user may make the first pressure touch 410 at a third pressure and enter the continuous movement (from 410*a* to 410*b*) at a fourth pressure (e.g., the third pressure the fourth pressure).

According to an embodiment of the present invention, the "continuous movement of touch" may include a plurality of touches, and the above-described two touch positions 410*a* and 410*b* are merely an example; however, embodiments of the present invention are not limited thereto.

Unless the continuous movement of the first pressure touch is received in step S307 of FIG. 3, the process goes to step S309 of FIG. 3.

In step S308 of FIG. 3, the cursor moves from syllable to syllable.

Referring to FIG. 4*c*, the controller 110 may continuously move the cursor position 191*a*11 (to, e.g., 191*a*11 through 191*a*13) displayed on the display region 191*a*, corresponding to the continuous movement of the first pressure touch 410.

The controller 110 may move the cursor position 191*a*11, which is displayed on the display region 191*a*, from syllable to syllable (e.g., to 191*a*11 through 191*a*13) in the next line, corresponding to the direction of the continuous movement of the first pressure touch 410. Further, the controller 110 may continuously move the cursor position 191*a*11, which is displayed on the display region 191*a*, from syllable to syllable in the next line, corresponding to maintaining the continuous movement of the first pressure touch 410.

When the continuous movement (from 410*a* to 410*b*) of the first pressure touch is directed downwards (e.g., towards the home button, which varies depending on the orientation (portrait or landscape) of the portable device 100 in FIG. 4*a*), the cursor position 191*a*11 may be moved (e.g., to 191*a*11 through 191*a*13) from syllable to syllable in the next line. When the continuous movement (from 410*b* to 410*a*) of the first pressure touch is directed upwards (e.g., towards the first camera, which varies depending on the orientation (portrait or landscape) of the portable device 100 in FIG. 4*a*), the cursor position 191*c*13 may be moved (e.g., to 191*a*13 through 191*a*11) from syllable to syllable in the previous line.

The controller 110 may stop moving the cursor position 191*a*13 displayed on the display region 191*a*, corresponding to the continuous movement of the first pressure touch 410 stopping (e.g., upon touching off in the last position 410*b*).

The controller 110 may change the standard of movement of the cursor displayed on the display region 191*a* for the syllable-to-syllable movement of the cursor position on the display region 191*a* by the continuous movement of the first pressure touch 410 as per step S308 of FIG. 3 and the word-to-word movement of the cursor position on the display region 191*a* by the continuous movement of the second pressure touch 411 as per step S306 of FIG. 3, depending on whether an additional pressure touch is entered.

The controller 110 may provide the user with the feedback corresponding to the movement of the cursor position on the display region 191*a* by the continuous movement of the first pressure touch 410.

The controller 110 may provide one of visual feedback, auditory feedback, and tactile feedback. The controller 110 may provide the user with combinations of visual feedback, auditory feedback, and tactile feedback.

Since the feedback corresponding to the syllable-to-syllable movement of the cursor position on the display region 191*a* by the continuous movement of the first pressure touch 410 in step S308 of FIG. 3 is substantially similar to (e.g., differs in pressure touch from) the feedback corresponding to the word-to-word movement of the cursor position on the display region 191*a* by the continuous movement of the second pressure touch 411 in step S306 of FIG. 3, no repetitive description is given.

Another embodiment of the present invention is described with reference to FIG. 4*h*.

Figure 4D:
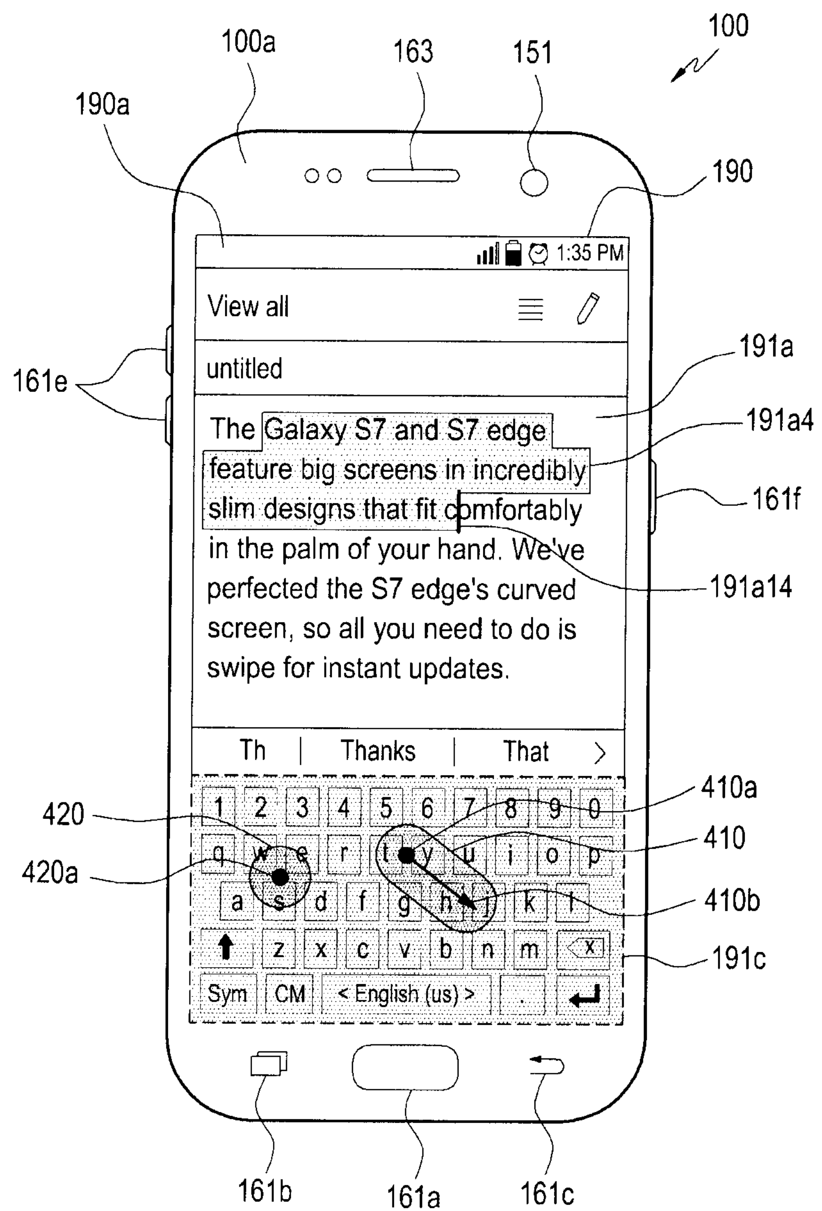
Figure 4E:
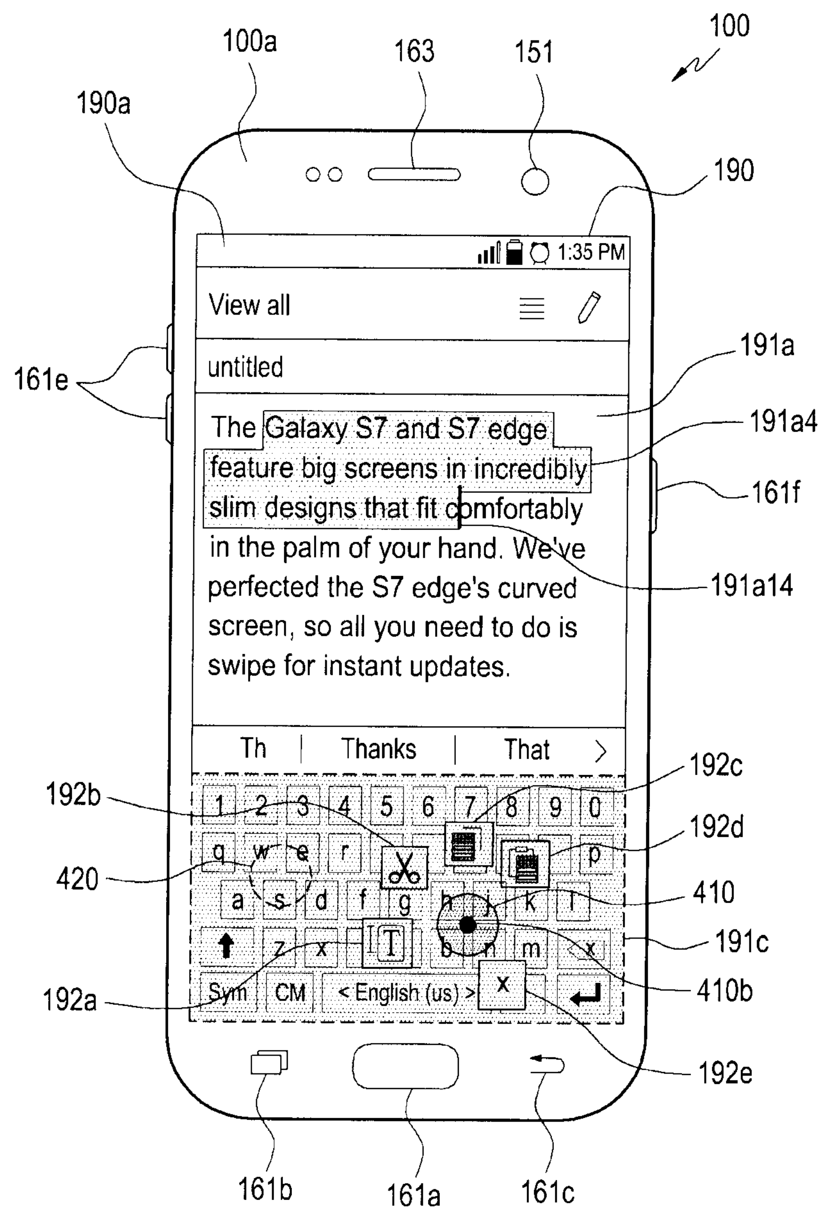
Figure 4F:
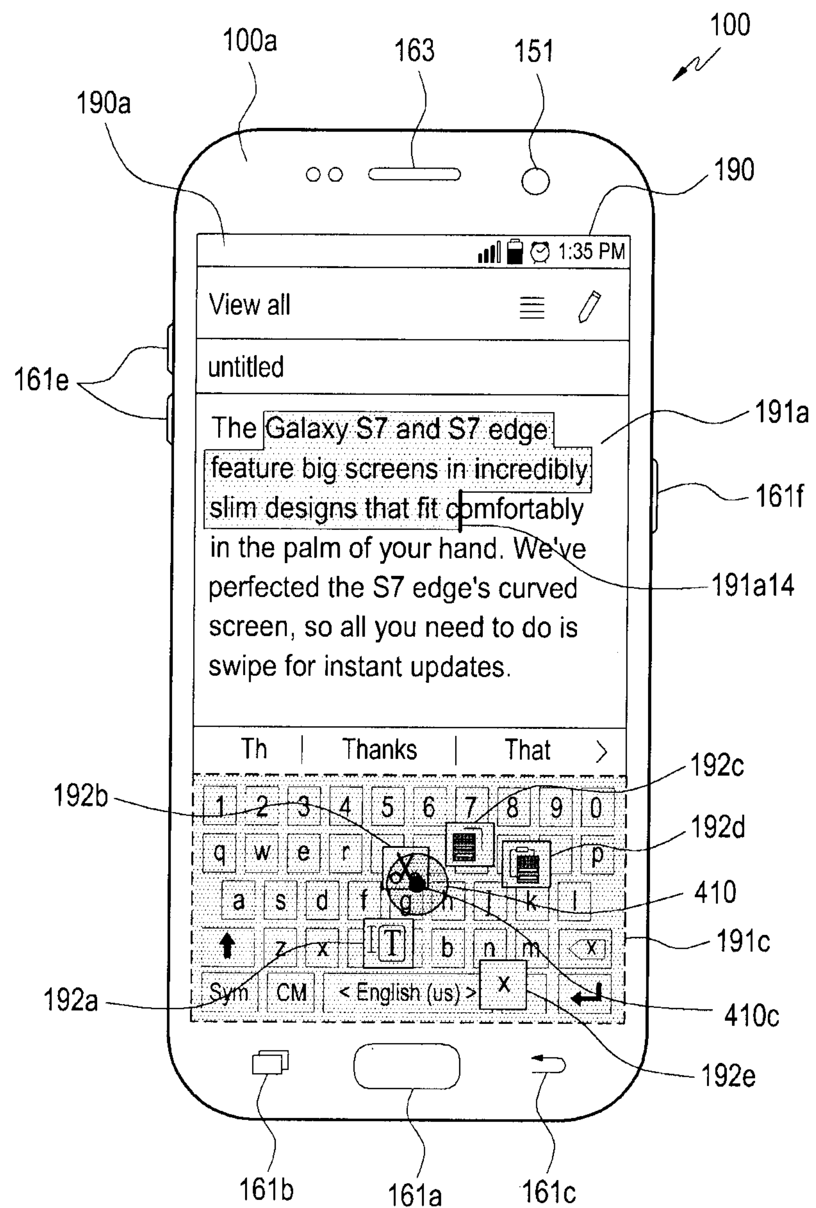
Figure 4G:
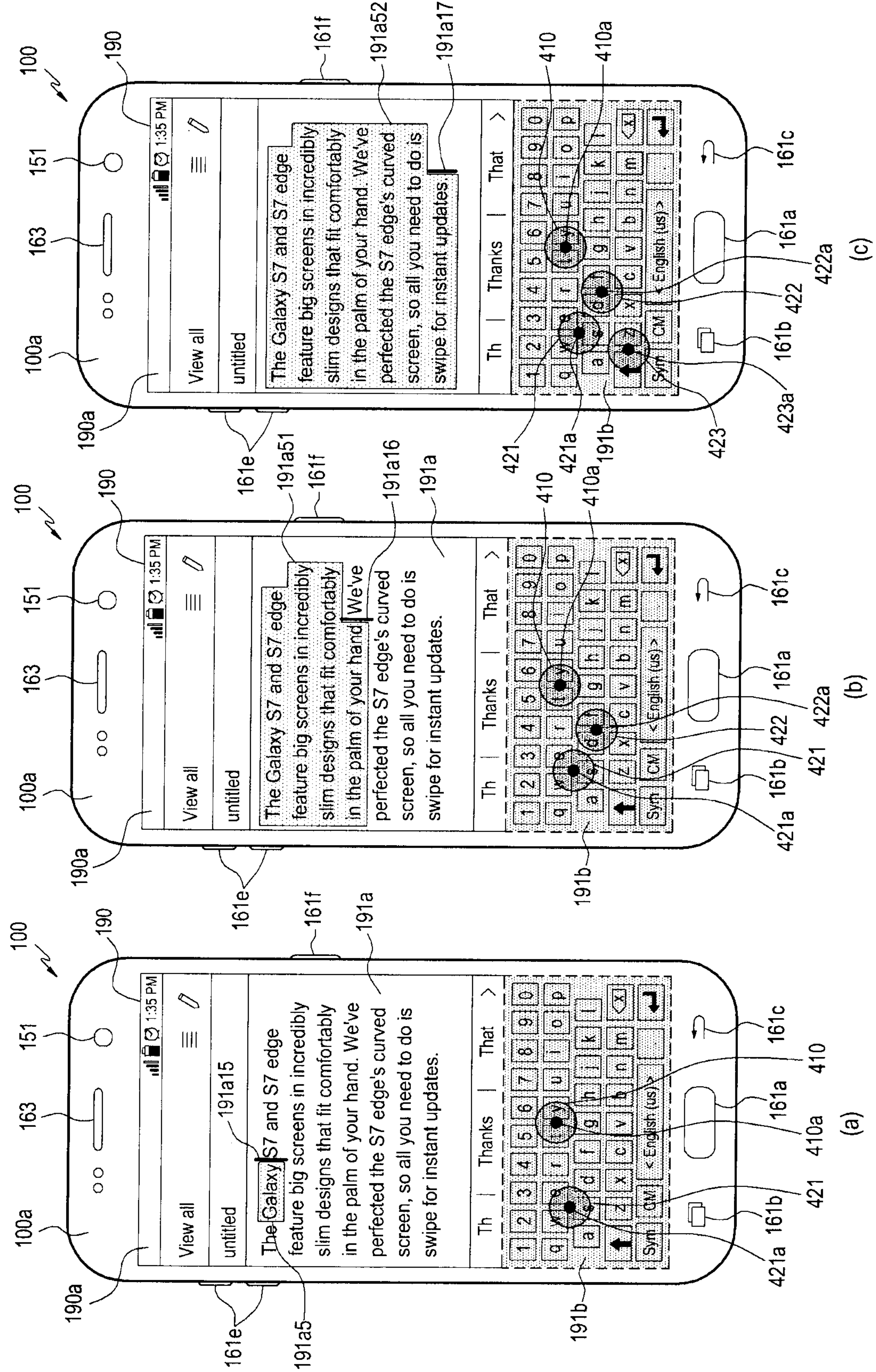
Figure 4H:
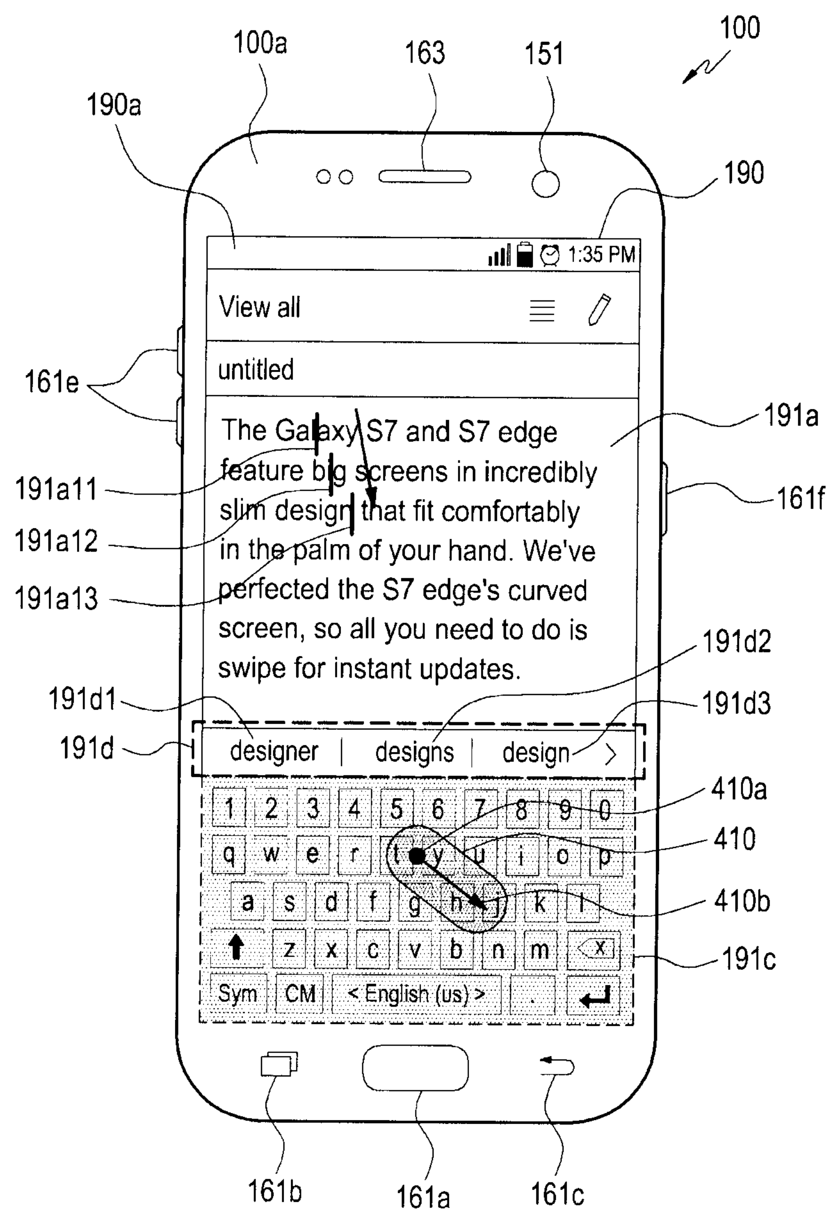

Referring to FIG. 4*h*, when the cursor position is moved from syllable to syllable on the display region 191*a*, corresponding to the continuous movement of the first pressure touch 410, the controller 110 may display a suggested word corresponding to the current cursor position in a word suggestion region 191*d*. For example, when the cursor is located in the current cursor position (controller 110) corresponding to the continuous movement of the first pressure touch 410, the controller 110 may display suggested words (e.g., 191*d*1, 191*d*2, and 191*d*3) corresponding to the current cursor position 191*a*13 in the word suggestion region 191*d*. The user may choose a suggested word 191*d*2 by touching (not shown).

When the continuous movement of the first pressure touch 410 ends (e.g., touch-off), the controller 110 may terminate the display of the suggested words in the word suggestion region 191*d*.

The above-mentioned three suggested words merely amount to an example. When the user selects a direction key on the right side of the suggested word 191*d*3, the controller 110 may further display other suggested words (not shown).

According to another embodiment of the present invention, when the user swipes (or flicks or drags) to the left, the controller 110 may display an auxiliary function icon (e.g., a microphone icon corresponding to a voice input or a gear icon corresponding to the settings—not shown). The controller 110 may determine the number of auxiliary function icons displayed on the word suggestion region 191*d* corresponding to the length of the user's swipe (or flick or drag).

Corresponding to the length of the user's swipe (or flick or drag), the controller 110 may display suggested words (e.g., 191*d*11) along with auxiliary function icons (not shown) in the word suggestion region 191*d*.

The controller 110 may determine whether to display suggested words in the word suggestion region 191*d* corresponding to the speed of the continuous movement of the first pressure touch 410. For example, when the speed of the continuous movement of the first pressure touch 410 is smaller than 50 cm/s (which is variable depending on the manufacturer's settings or user settings), the controller 110 may display suggested words in the word suggestion region 191*d* corresponding to the speed of the continuous movement of the first pressure touch 410. When the speed of the continuous movement of the first pressure touch 410 is larger than 50 cm/s, the controller 110 may abstain from displaying suggested words in the word suggestion region 191*d* corresponding to the speed of the continuous movement of the first pressure touch 410.

It would readily be appreciated by one of ordinary skill in the art that the speed, 50 cm/s, is merely an example and is variable depending on the size and/or resolution of the touchscreen 190 of the portable device 100.

In step S308 of FIG. 3, when the cursor moves from syllable to syllable, the method for controlling the cursor on the portable device is terminated.

Unless the continuous movement of the first pressure touch is received back in step S307 of FIG. 3, the process goes to step S309 of FIG. 3.

In step S309 of FIG. 3, a first touch is entered, and the continuous movement of the first pressure touch is received.

Referring to FIGS. 4*a* and 4*d*, the user makes the first pressure touch 410 and additionally inputs the first touch 420 to the second keypad 191*c*. The user may input the first pressure touch 410 using their left or right hand and may input the additional first touch 420 with the other hand Or, the user may input the first pressure touch 410 and the first touch 420 with their left or right hand. The first touch may be a pressure touch like the above-described first pressure touch and second pressure touch.

The controller 110 may detect the first touch 420 to the second keypad 191*c* using the touchscreen 190 and the touchscreen controller 195. Further, the controller 110 may detect the first touch 420 to the second keypad 191*c* using the second keypad 191*c*, the touchscreen 190, and/or the touchscreen controller 195.

The controller 110 may calculate the first touch position 420*a* (e.g., coordinates X2 and Y2) corresponding to the first touch 420 using the electrical signal received from the touchscreen controller 195.

The controller 110 may store, in the storage unit 175, first touch information corresponding to, e.g., the first touch position 420*a*, the time of detecting the first touch (e.g., 10:07 AM), the pressure value of the first touch 420, and the electrical signal corresponding to the first touch 420.

The user may keep the first touch 420 in contact.

When the first touch 420 is detected, the user enters the continuous movement of the first pressure touch 410.

The controller 110 may detect (or calculate) the continuous movement (e.g., a plurality of X coordinates and Y coordinates corresponding to the continuous touch) of the first pressure touch 410 detected from the second keypad 191*c* using the touchscreen 190 and the touchscreen controller 195. Position information corresponding to the continuous movement of the first pressure touch 410 may be stored in the storage unit 175 under the control of the controller 110.

Since detecting the continuous movement of the first pressure touch 410 in step S310 of FIG. 3 is substantially similar to (e.g., differs in step from) detecting the continuous movement of the first pressure touch 410 in step S307 of FIG. 3, no repetitive description is presented.

In step S311 of FIG. 3, text is selected.

Referring to FIG. 4*d*, text is selected (191*a*4) corresponding to the continuous movement of the first pressure touch 410 and the first touch 420. The controller 110 may display the text to be selected (191*a*4) by highlighting the text from the first cursor position 191*a*11 corresponding to the continuous movement of the first pressure touch 410 and the first touch 420.

The controller 110 may display the text to be is selected (191*a*4) by moving (e.g., from 191*a*11 to 191*a*14) the cursor position 191*a*11 on the display region 191*a* from syllable to syllable in the next line, corresponding to the direction of the continuous movement of the first pressure touch 410 and the detection of the first touch 420. Further, the controller 110 may continuously move the cursor position 191*a*11, which is displayed on the display region 191*a*, from syllable to syllable in the next line, corresponding to maintaining the continuous movement of the first pressure touch 410.

Since the feedback corresponding to the syllable-to-syllable movement of the cursor position on the display region 191*a* by the continuous movement of the first pressure touch 410 in step S308 of FIG. 3 is substantially similar to (e.g., differs in pressure touch from) the feedback corresponding to the word-to-word movement of the cursor position on the display region 191*a* by the continuous movement of the second pressure touch 411 in step S306 of FIG. 3, no repetitive description is given.

A method for selecting text according to another embodiment of the present invention is described with reference to FIGS. 4*a* and 4*g*. In FIG. 4*g* (*a*), the user keeps the first pressure touch 410 in contact and enters a first tap 421 to the second keypad 191*c*.

The controller 110 may detect the first tap 421 to the second keypad 191*c* using the touchscreen 190 and the touchscreen controller 195. Further, the controller 110 may detect the first tap 421 to the second keypad 191*c* using the second keypad 191*c*, the touchscreen 190, and/or the touchscreen controller 195.

The controller 110 may calculate the first tap position 421*a* (e.g., coordinates X21 and Y21) corresponding to the first tap 421 by using the electrical signal received from the touchscreen controller 195.

The controller 110 may store, in the storage unit 175, first tap information corresponding to, e.g., the first tap position 421*a*, the time of detection of the first tap 421 (e.g., 10:07 AM), the pressure value of the first tap 421, and the electrical signal corresponding to the first tap 421.

Referring to FIGS. 4*a* and 4*g*(*a*), when the first tap 421 is detected, the controller 110 may display the word (e.g., 'galaxy') corresponding to the current cursor position 191*a*1 as selected (191*a*5) in highlight. When the current cursor position 191*a*1 in the word is positioned ahead of the word (e.g., ahead of 'g' in 'galaxy'), behind the word (e.g., behind 'y' in 'galaxy'), or somewhere in the word (e.g., between 'g' and 'y' in 'galaxy'), the word (e.g., 'galaxy') corresponding to the current cursor position 191*a*1 may be displayed as selected (191*a*5) in highlight. When the first tap 421 is detected, the controller 110 may display the cursor position 191*a*15 behind (191*a*15) the word (e.g., 'galaxy') corresponding to the current cursor position 191*a*1.

The above word may be applicable to other languages, e.g., Korean, Japanese, French, or German, which the application provides, as well as English.

In FIG. 4g(b), the user keeps the first pressure touch 410 in contact and enters a second tap (or a double tap) 422 to the second keypad 191c. The user keeps the first pressure touch 410 in contact and enters the double tap 421 and 422 to the second keypad 191c.

The controller 110 may detect the double tap 421 and 422 to the second keypad 191c using the touchscreen 190 and the touchscreen controller 195. Further, the controller 110 may detect the double tap 421 and 422 to the second keypad 191c using the second keypad 191c, the touchscreen 190, and/or the touchscreen controller 195.

The controller 110 may calculate the double tap positions 421a (e.g., coordinates X21 and Y21) and 422a (e.g., coordinates X22 and Y22) corresponding to the double tap 421 and 422 using the electrical signal received from the touchscreen controller 195.

The controller 110 may store, in the storage unit 175, double tap (421 and 422) information corresponding to, e.g., the double tap positions 421a and 422a, the time of detection of the double tap 421 and 422 (e.g., 10:07 AM), the pressure value of the double tap 421 and 422, and the electrical signal corresponding to the double tap 421 and 422.

Referring to FIGS. 4a and 4g(b), when the double tap 421 and 422 is detected, the controller 110 may display the sentence including the word (e.g., 'galaxy') corresponding to the current cursor position 191a1 as selected (191a51) in highlight. When the double tap 421 and 422 is detected, the controller 110 may display the cursor position 191a16 behind (e.g., behind the period of) the sentence including the word (e.g., 'galaxy') corresponding to the current cursor position 191a1.

The above sentence may be applicable to other languages, e.g., Korean, Japanese, French, or German, which the application provides, as well as English.

In FIG. 4g(c), the user keeps the first pressure touch 410 in contact and enters a third tap (or a triple tap) 423 to the second keypad 191c. The user keeps the first pressure touch 410 in contact and enters the triple tap 421, 422, and 423 to the second keypad 191c.

The controller 110 may detect the triple tap 421, 422, and 423 to the second keypad 191c using the touchscreen 190 and the touchscreen controller 195. Further, the controller 110 may detect the triple tap 421, 422, and 423 to the second keypad 191c using the second keypad 191c, the touchscreen 190, and/or the touchscreen controller 195.

The controller 110 may calculate the triple tap positions 421a (e.g., coordinates X21 and Y21), 422a (e.g., coordinates X22 and Y22), and 423a (e.g., coordinates X23 and Y23) corresponding to the triple tap 421, 422, and 423 using the electrical signal received from the touchscreen controller 195.

The controller 110 may store, in the storage unit 175, triple tap (421, 422, and 423) information corresponding to, e.g., the triple tap positions 421a, 422a, and 423a, the time of detection of the triple tap 421, 422, and 423 (e.g., 10:07 AM), the pressure value of the triple tap 421, 422, and 423, and the electrical signal corresponding to the triple tap 421, 422, and 423.

Referring to FIGS. 4a and 4g(c), when the triple tap 421, 422, and 423 is detected, the controller 110 may display the full text including the current cursor position 191a1 as selected (191a52) in highlight. When the triple tap 421, 422, and 423 is detected, the controller 110 may display the cursor position 191a17 behind (e.g., behind the period of) the full text including the current cursor position 191a1.

The above sentence may be applicable to other languages, e.g., Korean, Japanese, French, or German, which the application provides, as well as English.

Another embodiment of the present invention is described with reference to FIGS. 4i and 4j.

Figure 4I:
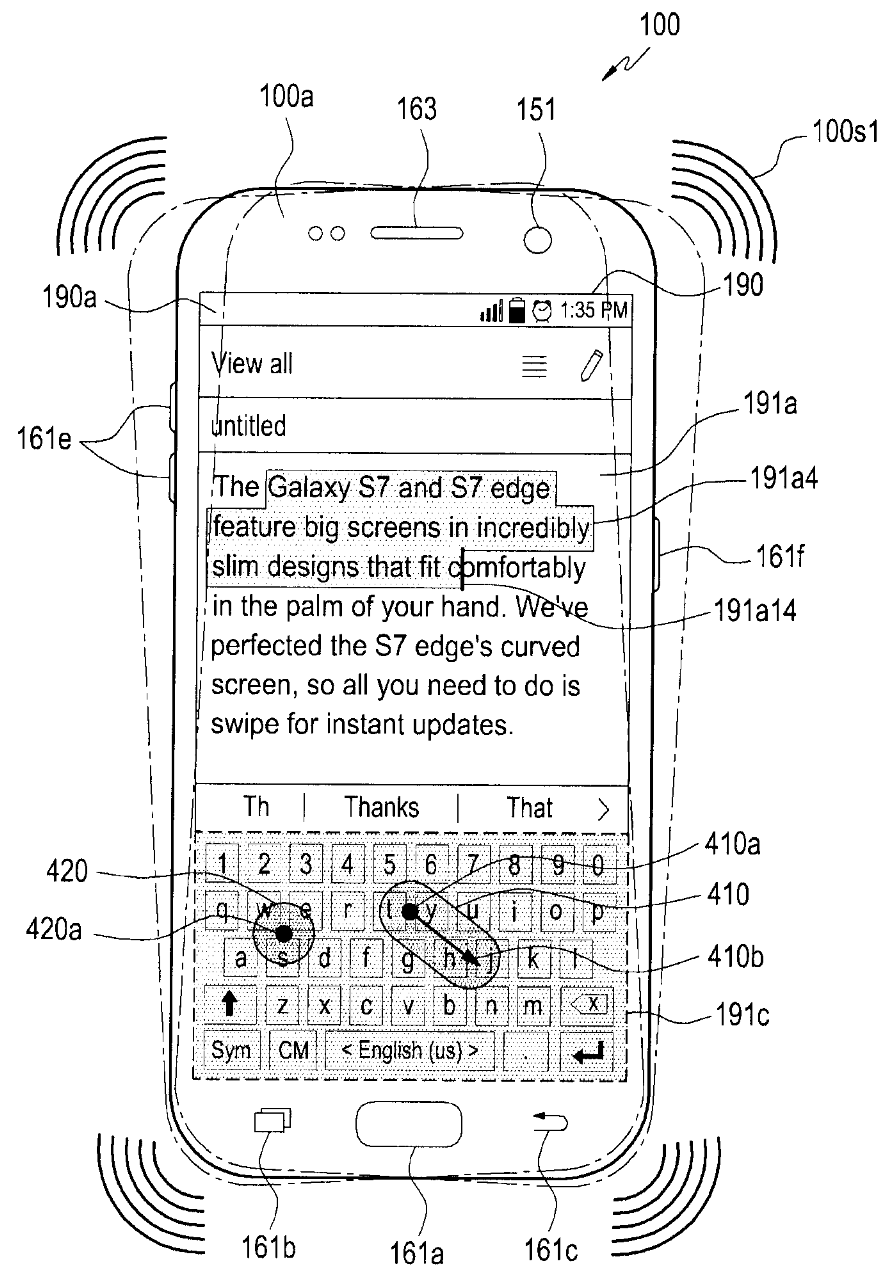
Figure 4J:
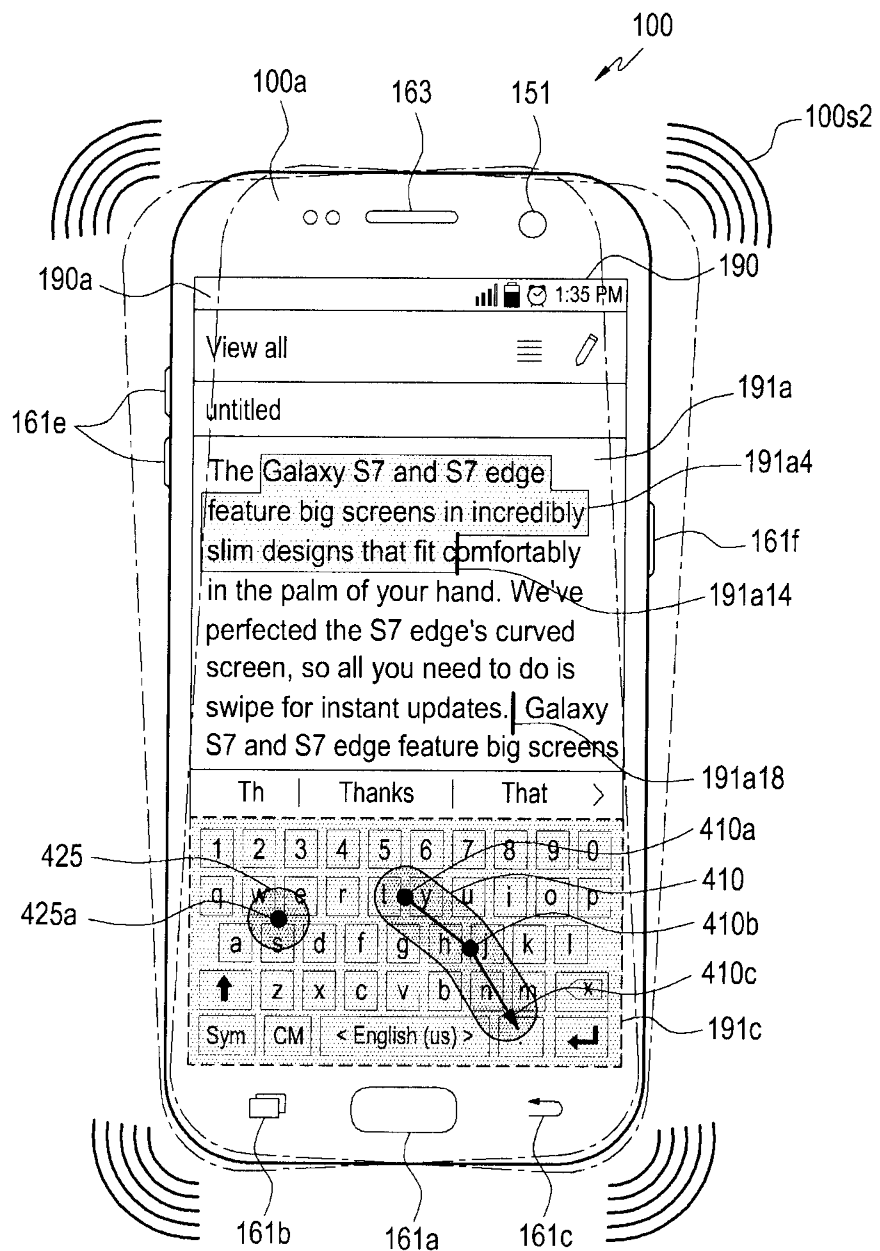

Referring to FIGS. 4i and 4j, text in the display region 191a is selected (191a4) corresponding to the continuous movement of the first pressure touch 410 and the first touch 420. The controller 110 may display the text to be selected (191a4) by highlighting the text from the first cursor position 191a11, corresponding to the continuous movement of the first pressure touch 410 and the first touch 420.

The user may keep the first touch 420 and the first pressure touch 410 in contact and shake the portable device 100 displaying the text selected (191a4) in highlight. The user may shake the portable device 100, with the text selected (191a4) in highlight, as if they shook hands. The first shake 100s1 of the portable device 100 may be detected by a sensor (e.g., an acceleration sensor, gyro sensor, or motion sensor) in the portable device 100.

The controller 110 may copy the selected text 191a4 corresponding to detecting the first shake by the sensor. The copied text 191a4 (e.g., 'Galaxy S7 and S7 edge feature big screens in incredibly slim designs that fit') may be temporarily stored in the memory.

The user may release the first touch 420. The user may advance the continuous movement of the first pressure touch 410 to where the copied text 191a4 is supposed to be pasted.

When the continuous movement of the first pressure touch 410 reaches the final position 410 where the copied text 191a4 is supposed to be pasted by the user, the user enters a first-first touch 425.

The user may keep the first-first touch 425 and the first pressure touch 410 in contact and shake the portable device 100. The second shake 100s2 of the portable device 100 may be detected by a sensor (e.g., an acceleration sensor, gyro sensor, or motion sensor) in the portable device 100.

When the second shake 100s2 is detected, the controller 110 may paste the copied text 191a4 in the current cursor position 191a18 corresponding to the final position 410c of the continuous movement of the first pressure touch 410.

The copy-and-paste by the first shake and the second shake detected by the sensor while running the above-described same application (e.g., a memo application) is merely an example, and the application executed during the detected first shake may differ from the application executed during the detected second shake (e.g., the detected first shake may be made while a memo application is running, and the detected second shake may be made while an SNS application is running) In the copy-and-paste by the first shake and second shake, other applications may be ones executable or installable on the portable device 100.

Another embodiment of the present invention is described with reference to FIGS. 4k to 4m.

Figure 4K:
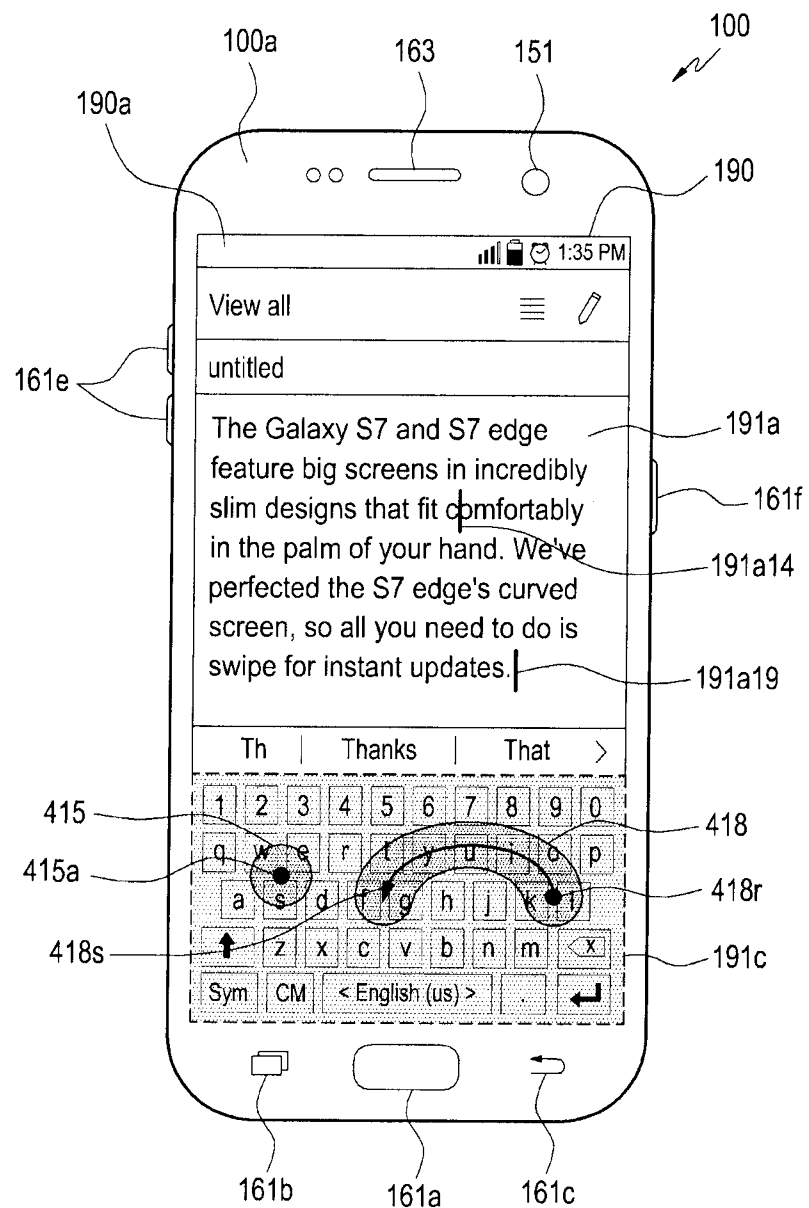
Figure 4L:
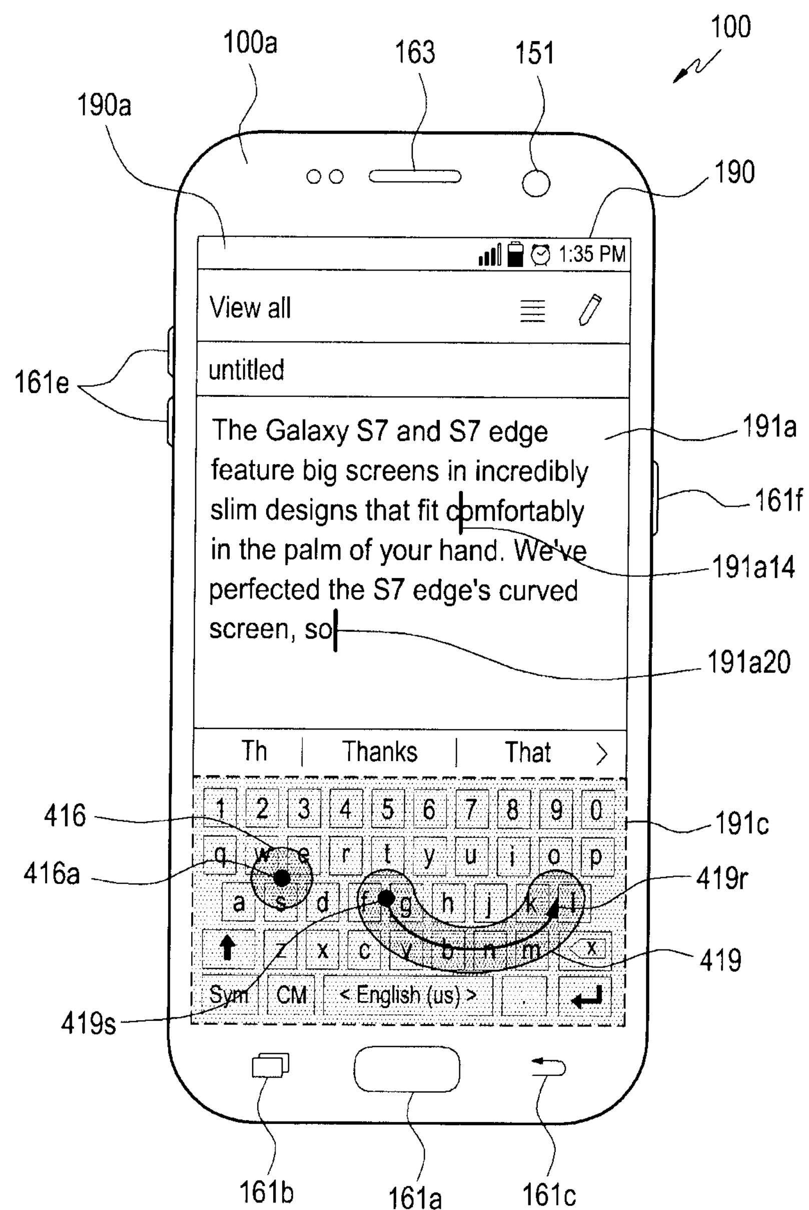
Figure 4M:
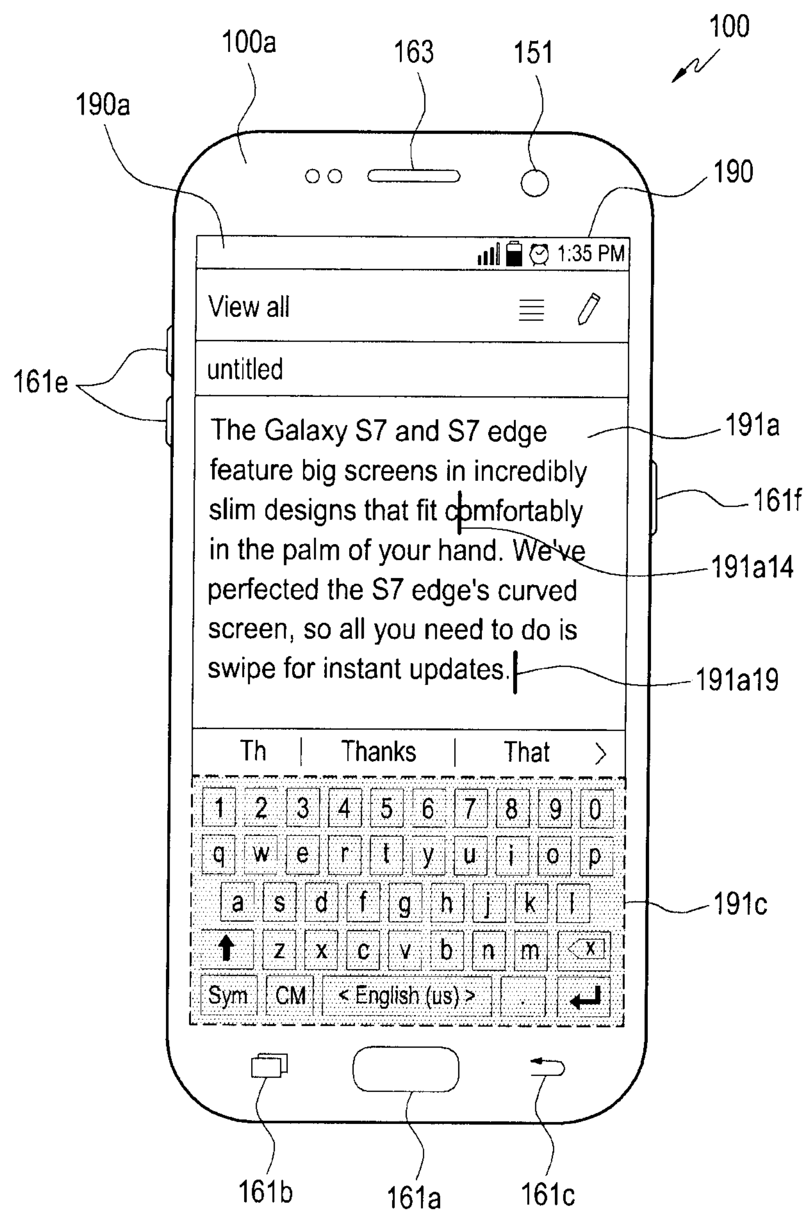

Referring to FIGS. 4k to 4m, text is displayed in the display region 191a by the user's input. The current cursor position 191a19 may be behind the last word ('updates') of the sentences in the display region 191a. The current cursor position may be anywhere in the display region 191a.

Referring to FIG. 4k, the user enters a first-first pressure touch 415 to the input region 191b. The controller may detect the first-first pressure touch 415 using the touchscreen 190 and the touchscreen controller 195. Since detecting the first-first pressure touch 415 in FIG. 4k is substantially similar to (e.g., differs in pressure touch from) detecting the first pressure touch 410 in FIG. 4*a*, no repetitive description is given.

The user enters a first-second pressure touch 418 to the second keypad 191*c*. The controller may detect the first-second pressure touch 418 using the touchscreen 190 and the touchscreen controller 195. Since detecting the first-second pressure touch 418 in FIG. 4*k* is substantially similar to (e.g., differs in pressure touch from) detecting the first pressure touch 410 in FIG. 4*a*, no repetitive description is given.

The user enters the continuous movement of the first-second pressure touch 418. The user may enter the continuous movement of the first-second pressure touch 418 counterclockwise. The counterclockwise continuous movement of the first-second pressure touch 418 may be a touch gesture corresponding to a counterclockwise rotation.

Upon detecting the counterclockwise continuous movement of the first-second pressure touch 418 by the user, the controller 110 may delete each word (differentiated by, e.g., space) out of the entered text from the current cursor position 191*a*19.

Upon detecting the counterclockwise continuous movement of the first-second pressure touch 418 on the second keypad 191*c*, the controller 110 may undo the entry of the text (e.g., deletes the entered text) from the current cursor position 191*a*19.

Upon continuously detecting the continuous movement at an angle more than the present angle (e.g. 100° which is variable in the settings) from the first position 418*r* of the first-second pressure touch 418 counterclockwise on the second keypad 191*c*, the controller 110 may redo the entry of the text from the current cursor position 191*a*19.

The controller 110 may detect the continuous movement of the first-second pressure touch 418 on the second keypad 191*c* at 720° counterclockwise (which is variable in the settings) from the first position 418*r*.

While rotating the continuous movement of the first-second pressure touch 418 at 720° (which is variable in the settings) counterclockwise from the first position 418*r* on the second keypad 191*c*, the controller 110 may delete (e.g., up to 191*a*14) the text entered during a set time (e.g., 1 hour which is variable in the settings). For example, when the continuous movement of the first-second pressure touch 418 rotates at 720° counterclockwise on the second keypad 191*c*, the controller 110 may delete some text (from 191*a*19 to 191*a*14) from the displayed text.

Corresponding to the counterclockwise continuous movement of the first-second pressure touch 418 on the second keypad 191*c*, the controller 110 may delete the text (from 191*a*19 to 191*a*20) up to the current cursor position 191*a*20.

Referring to FIGS. 4*l* and 4*m*, the user enters a first-third pressure touch 416 to the input region 191*b*. The controller may detect the first-third pressure touch 416 using the touchscreen 190 and the touchscreen controller 195. Since detecting the first-third pressure touch 416 in FIG. 4*l* is substantially similar to (e.g., differs in pressure touch from) detecting the first-first pressure touch 415 in FIG. 4*k*, no repetitive description is given.

The user enters a first-fourth pressure touch 419 to the second keypad 191*c*. The controller may detect the first-fourth pressure touch 418 using the touchscreen 190 and the touchscreen controller 195. Since detecting the first-fourth pressure touch 419 in FIG. 4*l* is substantially similar to (e.g., differs in pressure touch from) detecting the first-second pressure touch 418 in FIG. 4*k*, no repetitive description is given.

The user enters the continuous movement of the first-fourth pressure touch 419. The user may enter the continuous movement of the first-fourth pressure touch 419 clockwise. The clockwise continuous movement of the first-fourth pressure touch 419 may be a touch gesture corresponding to rotation clockwise.

Upon detecting the clockwise continuous movement of the first-fourth pressure touch 419 by the user, the controller 110 may redo the deletion of each word (differentiated by, e.g., space) out of the entered text from the current cursor position 191*a*20.

Upon detecting the clockwise continuous movement of the first-fourth pressure touch 419 on the second keypad 191*c*, the controller 110 may recover the deleted text (e.g., undo the deletion of the text) from the current cursor position 191*a*20.

Upon continuously detecting the continuous movement at an angle more than the present angle (e.g. 100° which is variable in the settings) from the first position 419*s* of the first-fourth pressure touch 419 clockwise on the second keypad 191*c*, the controller 110 may redo the entry of the deleted text from the current cursor position 191*a*20.

The controller 110 may detect the continuous movement of the first-fourth pressure touch 419 on the second keypad 191*c* at 720° (which is variable in the settings) clockwise from the first position 419*s*.

While rotating the continuous movement of the first-fourth pressure touch 419 at 720° (which is variable in the settings) clockwise from the first position 419*s* on the second keypad 191*c*, the controller 110 may recover the deleted text (e.g., up to 191*a*19) during a set time (e.g., 1 hour which is variable in the settings). For example, when the continuous movement of the first-fourth pressure touch 419 rotates at 720° clockwise on the second keypad 191*c*, the controller 110 may recover some text (from 191*a*20 to 191*a*19) from the displayed text.

Corresponding to the clockwise continuous movement of the first-fourth pressure touch 419 on the second keypad 191*c*, the controller 110 may recover the text (from 191*a*20 to 191*a*19) up to the current cursor position 191*a*19.

In step S312 of FIG. 3, the first touch is released.

Referring to FIG. 4*e*, the user releases the first touch 420 contact. The released first touch 420 may be denoted with dashed lines. The controller 110 may detect the release of the first touch 420 using the touchscreen 190 and the touchscreen controller 195.

When the first touch 420 is released, the controller 110 may display in highlight the text selected until the time of release of the first touch 410. When the first touch 420 is released, the controller 110 may terminate the selection of the text corresponding to the release of the first touch 410.

The controller 110 may add the first touch release time to the first touch information and store the same in the storage unit 175.

The user may release both the first touch 420 and the first pressure touch 410. When both the first touch 420 and the first pressure touch 410 are released, the controller 110 may terminate the selection of the text.

In step S313 of FIG. 3, a function icon is displayed to a side of the first pressure touch.

Referring to FIG. 4*e*, corresponding to the release of the first touch 420, the controller 110 may display function icons 192*a* to 192*e* to a side of the final position 410*b* of the first pressure touch 410 (e.g., spaced apart from the final position 410*b* of the first pressure touch 410). Further, corresponding to the release of the first touch 420, the controller 110 may display function icons 192*a* to 192*e* near the first pressure touch 410.

The controller 110 may display the function icons 192*a* to 192*e* to be spaced apart from the final position 410*b* of the first pressure touch 410 and to surround the final position 410*b* of the first pressure touch 410. The controller 110 may display the function icons 192*a* to 192*e* in a row to be spaced apart from the final position 410*b* of the first pressure touch 410 to a side (e.g., the left, right, upper, or lower side) of the final position 410*b* of the first pressure touch 410.

The function icons displayed to the side of the first pressure touch 410 may include a select all icon 192*a*, a cut icon 192*b*, a copy icon 192*c*, a paste icon 192*d*, and a delete icon 192*e*, which correspond to editing the text selected (191*a*4) in highlight. The function icons displayed to the side of the first pressure touch 410 may include at least one of the select all icon 192*a*, the cut icon 192*b*, the copy icon 192*c*, the paste icon 192*d*, and the delete icon 192*e*.

The function icons 192*a* to 192*e* may be overlaid on the second keypad 191*c*. The function icons 192*a* to 192*e* may be transparent and be displayed overlaid on the second keypad 191*c* (e.g., for the first keypad 191*b* or second keypad 191*c* to be shown a little bit). The function icons 192*a* to 192*e* may have the same resolution (or area) or some may differ in resolution (or area).

The above-described function icons 192*a* to 192*e* are merely an example, and embodiments of the present invention are not limited thereto. The above-described function icons 192*a* to 192*e* may add more icons, or be modified or deleted, corresponding to the functions (and/or operations) of the application.

In step S314 of FIG. 3, a function icon is selected, and the selected function is performed.

Referring to FIG. 4*f*, the user may select one 192*b* of the function icons 192*a* to 192*e* by continuously moving the first pressure touch 410. The continuous movement of the first pressure touch 410 means a movement (or arrival) from the current position 410*b* to the final position 410*c* corresponding to the function icon (e.g., 192*b*).

Since the continuous movement of the first pressure touch 410 in step S314 of FIG. 3 is substantially similar to (e.g., differs in final position from) the continuous movement of the first pressure touch in step S307 of FIG. 3, no repetitive description is presented.

When the continuous movement of the first pressure touch 410 reaches the final position 410*c*, the controller 110 may detect (or calculate) the continuous movement (e.g., a plurality of X coordinates and Y coordinates corresponding to the continuous touch) of the first pressure touch 410 detected from the second keypad 191*c* by using the touchscreen 190 and the touchscreen controller 195.

The controller 110 may determine the function icon 192*b* corresponding to the arrival at the final position 410*c* of the continuous movement of the first pressure touch 410.

The controller 110 may perform the function (e.g., editing) corresponding to the selected function icon 192*b*. For example, the controller 110 may cut the selected text 191*a*4 according to the function of the selected function icon 192*b*.

The controller 110 may provide the user with feedback corresponding to performing the function (cutting the selected text) by the selection of the function icon 192*b*.

The controller 110 may provide one of visual feedback, auditory feedback, and tactile feedback. The controller 110 may provide the user with combinations of visual feedback, auditory feedback, and tactile feedback.

Since the feedback corresponding to performing the function by the selection of the function icon 192*b* in step S314 of FIG. 3 is substantially similar to (e.g., selection of a function icon) the feedback corresponding to the word-to-word movement of the cursor position on the display region 191*a* by the continuous movement of the second pressure touch 411 in step S306 of FIG. 3, no repetitive description is given.

In step S314 of FIG. 3, when the function is performed by the selection of the function icon 192*b*, the method for controlling the cursor on the portable device is terminated.

Figure 5:
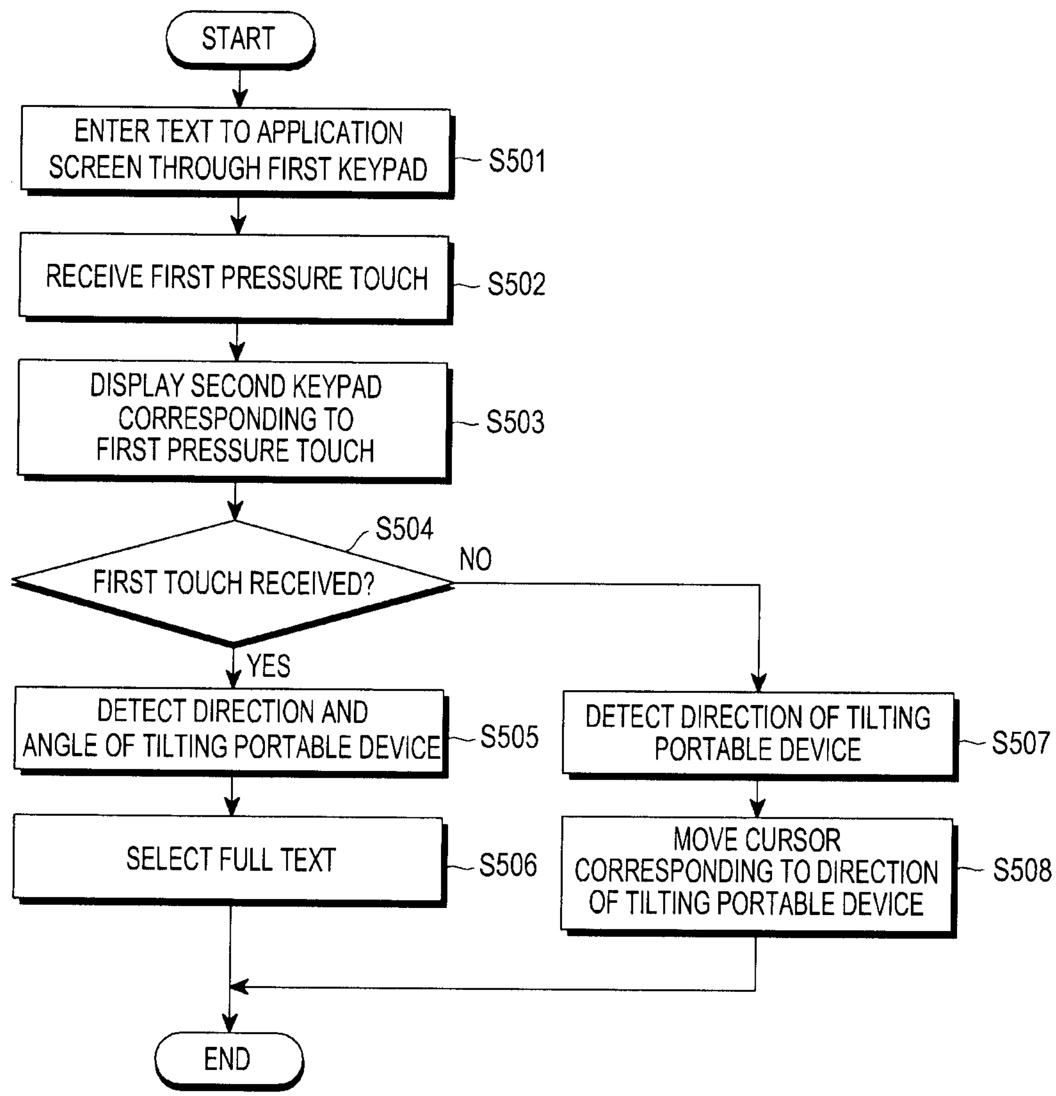
FIG. 5 is a flowchart schematically illustrating a method for controlling a cursor on a portable device according to another embodiment of the present invention.

FIG. 5 is a flowchart schematically illustrating a method for controlling a cursor on a portable device according to another embodiment of the present invention.

FIGS. 6*a* to 6*h* are views illustrating examples of a method for controlling a cursor on a portable device according to another embodiment of the present invention.

In step S501 of FIG. 5, text is entered to the application screen through a first keypad.

Figure 6A:
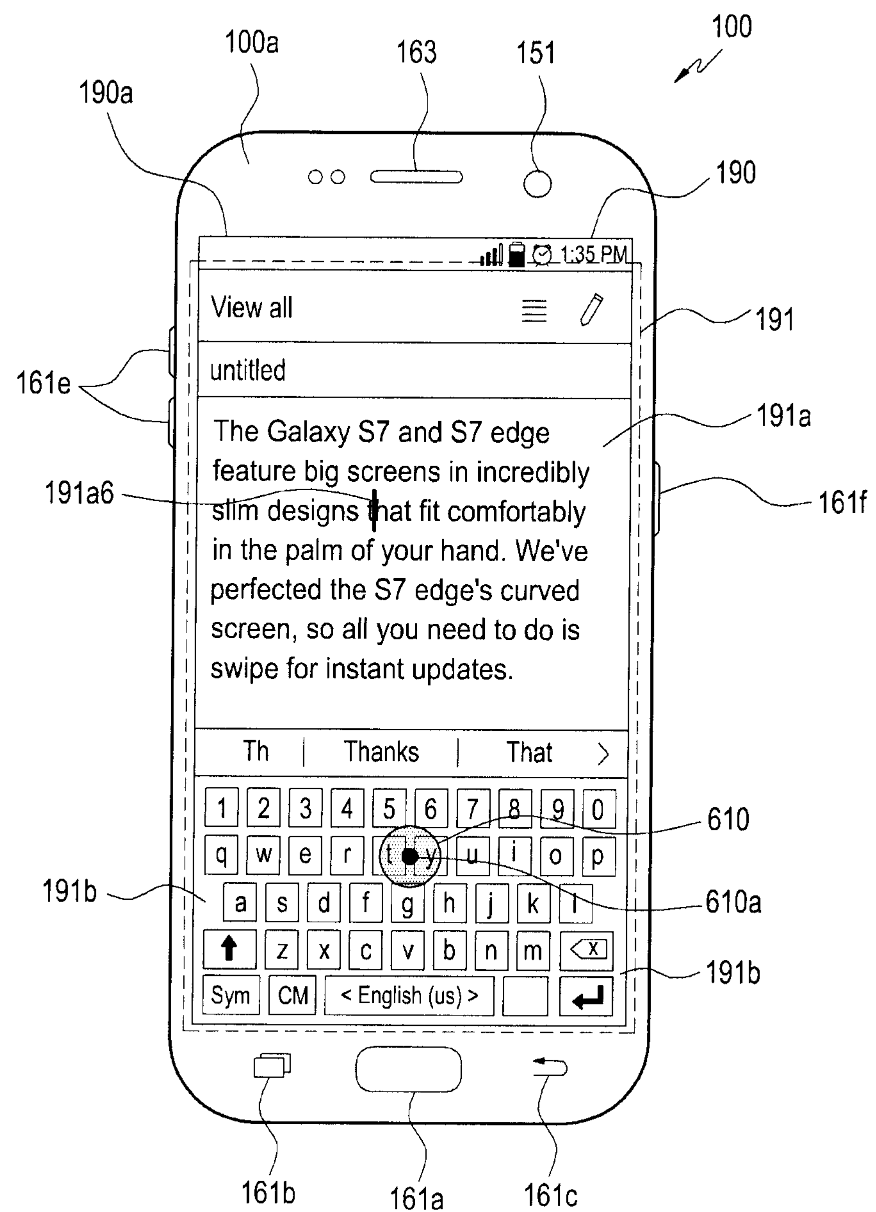
FIGS. 6*a* to 6*h* are views illustrating examples of a method for controlling a cursor on a portable device according to another embodiment of the present invention.

Referring to FIG. 6*a*, a memo application screen 191 is displayed on the touchscreen 190 of the portable device 100. The memo application screen 191 may include a display region 191*a* to display the cursor position 191*a*6 and entered text and an input region 191*b* to receive user inputs through one or more keys (or buttons) corresponding to displayed text. The user may select a key in the input region 191*b* by a touch (or touch gesture) using their body part and/or the input pen 167 to enter text. The user may also enter text via voice.

Since entering text to the application screen in step S501 of FIG. 5 is substantially similar to (e.g., differs in cursor position from) entering text to the application screen in step S301 of FIG. 3, no repetitive description is presented.

In step S502 of FIG. 5, a first pressure touch is received.

Referring to FIG. 6*a*, the user enters a first pressure touch 610 to the input region 191*b*. The controller 110 may detect the first pressure touch 610 to the second keypad 191*c* using the touchscreen 190 and the touchscreen controller 195. The controller 110 may calculate the first pressure touch position 610*a* (e.g., coordinates X31 and Y31) corresponding to the first pressure touch 610 detected in the first keypad 191*c* using the electrical signal received from the touchscreen controller 195.

Since the reception of the first pressure touch in step S502 of FIG. 5 is substantially similar to (e.g., differs in pressure touch from) the reception of the first pressure touch in step S302 of FIG. 3, no repetitive description is given.

In step S503 of FIG. 5, the second keypad corresponding to the first pressure touch is displayed.

Figure 6B:
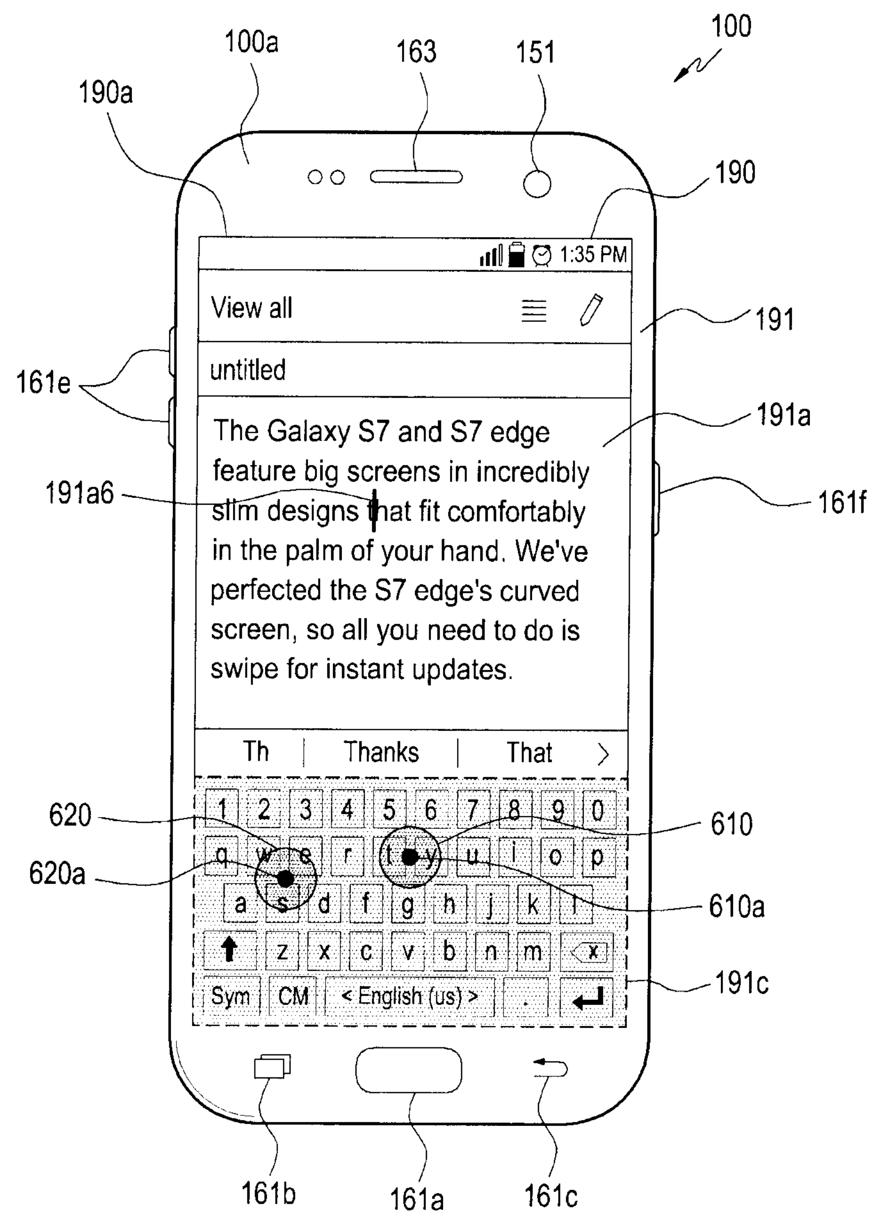

Referring to FIG. 6*b*, the controller 110 performs a control to display the second keypad 191*c* corresponding to the detected first pressure touch. The second keypad 191*c* may be overlaid on the input region 191*b* or may be displayed to be distinguished from the input region 191*b*.

Since the display of the second keypad 191*c* in step S503 of FIG. 5 is substantially similar to (e.g., differs in pressure touch from) the display of the second keypad 191*c* in step S303 of FIG. 3, no repetitive description is given.

In step S504 of FIG. 5, a first touch is received.

Referring to FIG. 6*b*, the user makes the first pressure touch 610 and additionally enters the first touch 620 to the second keypad 191*c*. The controller 110 may detect the first touch 620 to the second keypad 191*c* using the touchscreen 190 and the touchscreen controller 195.

The controller 110 may calculate the first touch position 620*a* (e.g., coordinates X32 and Y32) corresponding to the first touch 620 using the electrical signal received from the touchscreen controller 195.

Since entering the first touch 620 after the first pressure touch 610 in step S504 of FIG. 5 is substantially similar to (e.g., differs in embodiment from) entering the first touch 420 after the first pressure touch 410 in step S309 of FIG. 3, no repetitive description is given.

According to another embodiment of the present invention, a second pressure touch (not shown), rather than the first touch 620, may be entered. When the second pressure touch (not shown) is entered, the pressure of the second pressure touch (not shown) may be the same or different from the pressure of the first pressure touch 610.

In step S504 of FIG. 5, when the first touch is received, the process goes to step S505 of FIG. 5. In step S504 of FIG. 5, unless the first touch is received, the process goes to step S507 of FIG. 5.

In step S505 of FIG. 5, the direction and angle of the tilting portable device are detected.

Referring to FIG. 6*b*, the user keeps the first pressure touch 610 and the first touch 620 in contact and inclines the grabbed portable device 100.

The controller 110 detects the angle of the tilting portable device 100 using the sensor 173 for detecting tilt. The controller 110 may calculate the direction and angle of the tilting portable device 100 using the tilt detecting sensor 173.

The controller 110 may calculate the angle of the portable device 100 gradually tilting and store the angle in the storage unit 175.

In step S506 of FIG. 5, the full text is selected.

Figure 6C:
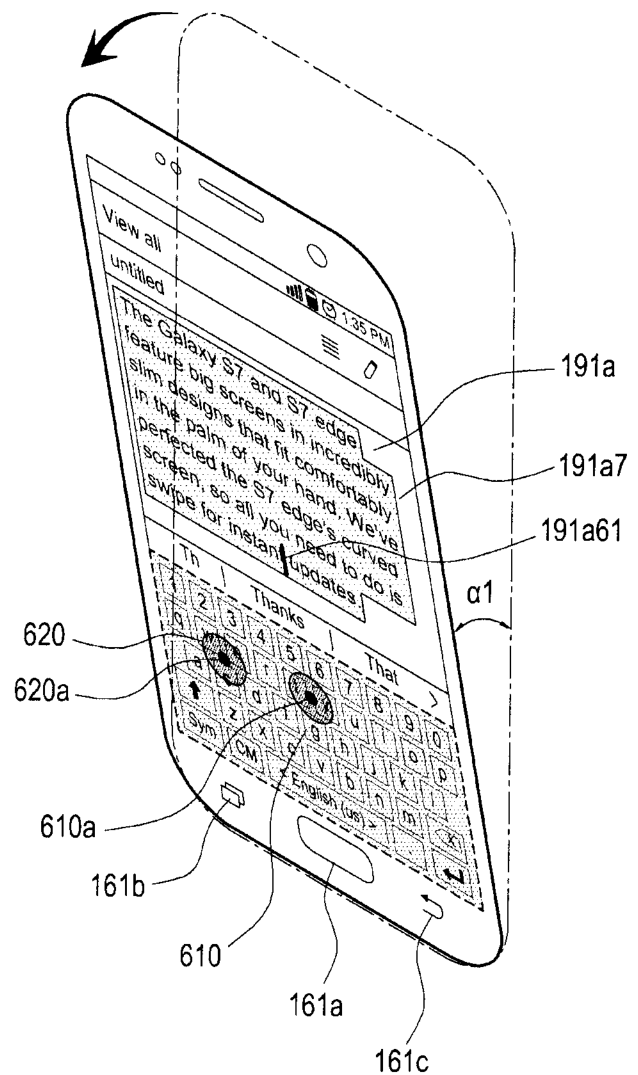
Figure 6D:
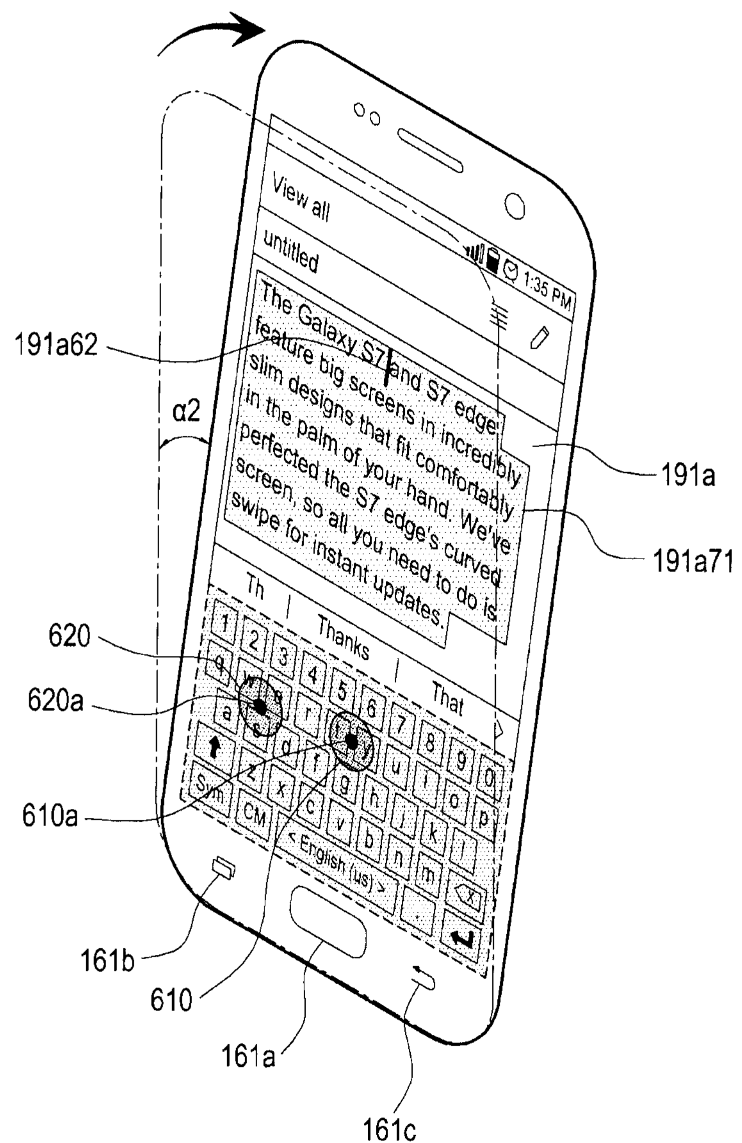
Figure 6E:
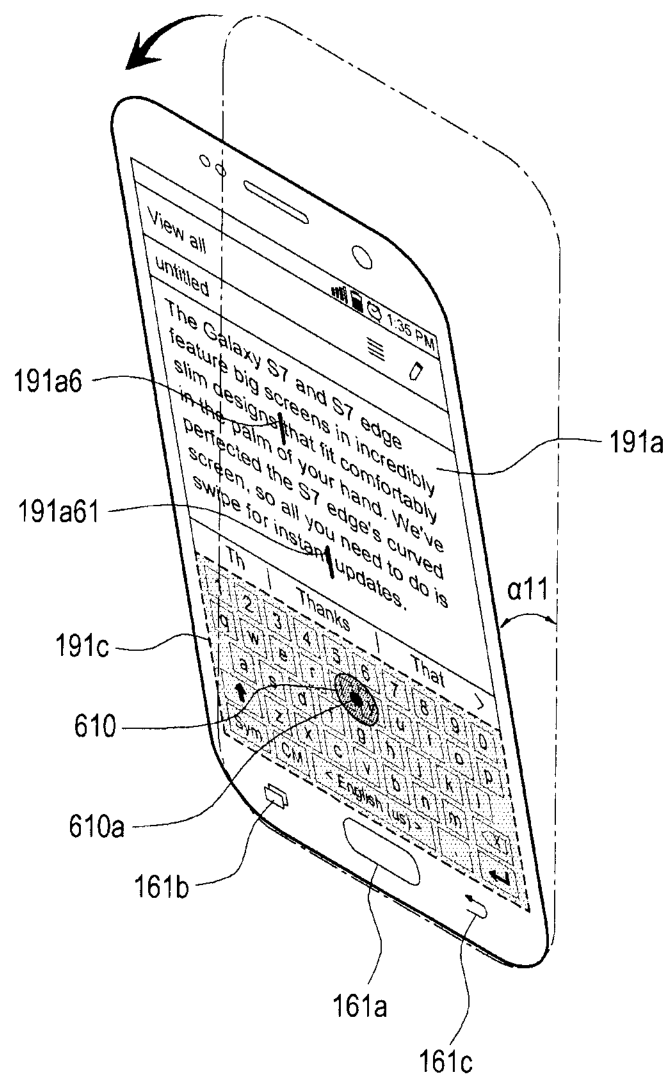
Figure 6F:
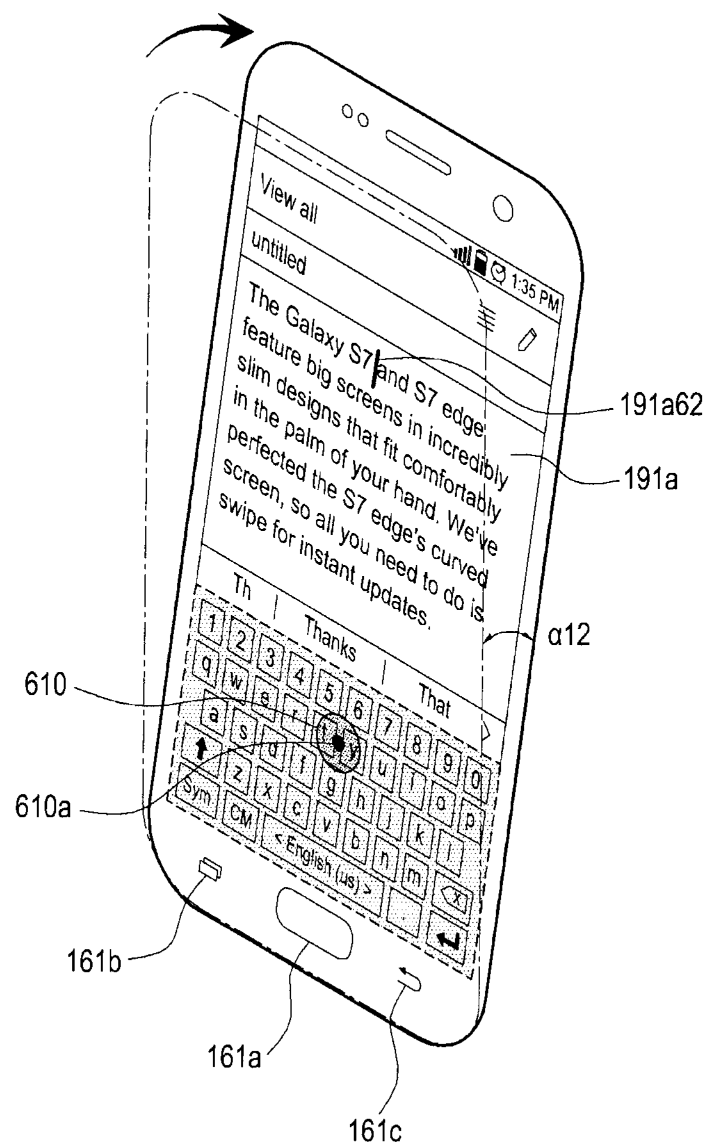
Figure 6G:
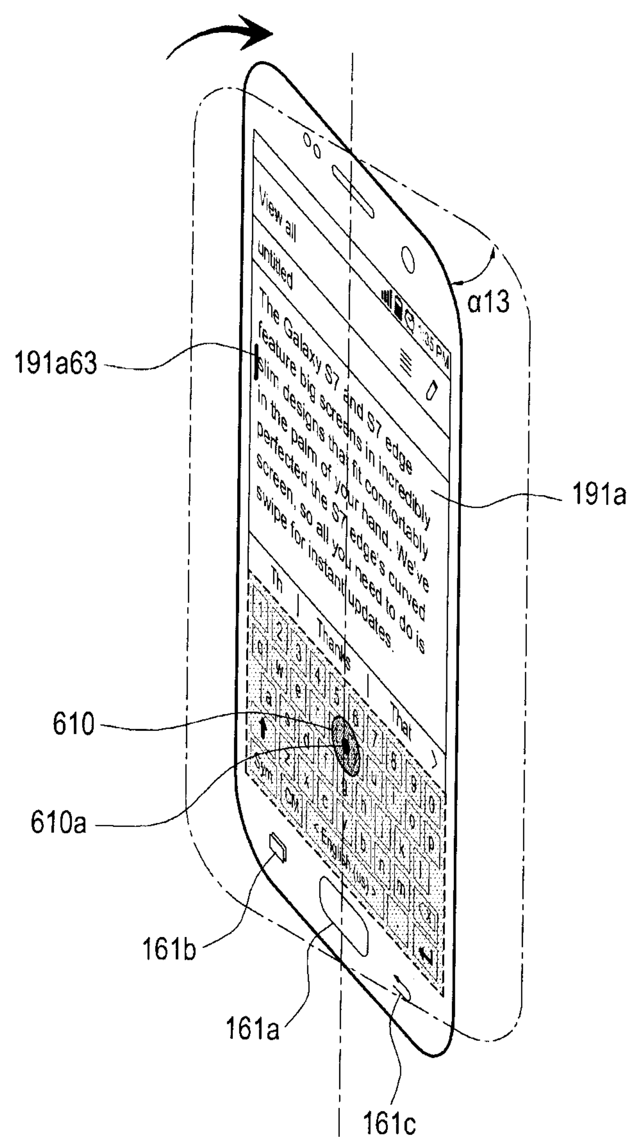
Figure 6H:
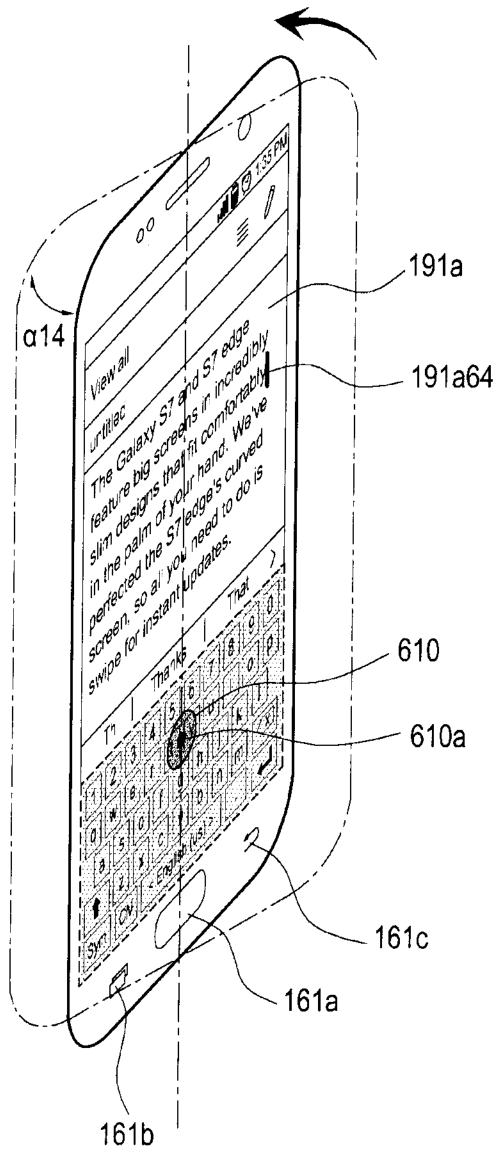

Referring to FIGS. 6*c* and 6*d*, the controller 110 of the portable device 100 gradually tilting in a front or rear direction, may compare the calculated angle with a threshold (e.g., α=30°, which is variable in the settings).

Referring to FIG. 6*c*, the controller 110 of the portable device 100 gradually tilting in a front direction may compare the calculated angle with a threshold (e.g., α1=30°, which is variable in the settings). Corresponding to the angle of the portable device 100 gradually tilting, the controller 110 may change the cursor position (e.g., from 161*a*6 to 191*a*61).

When the calculated angle exceeds the threshold, the controller 110 of the tilting portable device 100 may display the full text as selected (191*a*7) in highlight on the display region 191*a*. When the calculated angle exceeds the calculated angle, the controller 110 of the tilting portable device 100, the controller 110 may first select in highlight some text of the full text on the display region 191*a*, and when the portable device 100 in excess of the threshold continues to tilt, the controller 110 may select and display the rest text of the full text gradually (e.g., from top to bottom corresponding to the tilt of the portable device 100).

When the calculated angle exceeds the threshold, the controller 110 of the tilting portable device 100 may fix the cursor position (e.g., 191*a*61) displayed on the display region 191*a*.

Referring to FIG. 6*d*, the controller 110 of the portable device 100 gradually tilting in a rear direction may compare the calculated angle with a threshold (e.g., α2=30°, which is variable in the settings). Corresponding to the angle of the portable device 100 gradually tilting, the controller 110 may change the cursor position (e.g., from 161*a*6 to 191*a*62).

When the calculated angle exceeds the threshold, the controller 110 of the tilting portable device 100 may display the full text as selected (191*a*71) in highlight on the display region 191*a*. When the calculated angle exceeds the calculated angle, the controller 110 of the tilting portable device 100, the controller 110 may first select in highlight some text of the full text on the display region 191*a*, and when the portable device 100 in excess of the threshold continues to tilt, the controller 110 may select and display the rest text of the full text gradually (e.g., from bottom to top corresponding to the tilt of the portable device 100).

When the calculated angle exceeds the threshold, the controller 110 of the tilting portable device 100 may fix the cursor position (e.g., 191*a*62) displayed on the display region 191*a*.

The controller 110 may provide the user with feedback corresponding to the selection of the full text by the direction (or direction and angle) of the portable device 100.

The controller 110 may provide one of visual feedback, auditory feedback, and tactile feedback. The controller 110 may provide the user with combinations of visual feedback, auditory feedback, and tactile feedback.

Since the feedback corresponding to the selection of the full text by the direction (or direction and angle) of the portable device 100 in step S506 of FIG. 5 is substantially similar to (e.g., differs in function from) the feedback corresponding to the word-to-word movement of the cursor position on the display region 191*a* by the continuous movement of the second pressure touch 411 in step S306 of FIG. 3, no repetitive description is given.

In step S506 of FIG. 5, when the full text is selected, the method for controlling the cursor on the portable device is terminated.

Turning back to step S504 of FIG. 5, unless the first touch is received, the process goes to step S507 of FIG. 5.

In step S507 of FIG. 5, the direction of the tilting portable device 100 is detected.

Referring to FIGS. 6*e* to 6*h*, the user keeps the first pressure touch 610 in contact and tilts the grabbed portable device 100 up (e.g., all), down (e.g., α12), left (e.g., α13), or right (e.g., α14) (e.g., the one-dimensional axis, X, Y, or Z axis).

The user may keep the first pressure touch 610 in contact and tilt the grabbed portable device 100 in two dimensions (e.g., X-Y axes, X-Z axes, or Y-Z axes). When the portable device 100 tilts in two dimensions, the controller 110 may determine one prevailing direction of the two directions.

The user may keep the first pressure touch 610 in contact and tilt the grabbed portable device 100 in three dimensions. When the portable device 100 tilts in three dimensions, the controller 110 may determine one prevailing direction of the three directions.

The controller 110 detects the angle of the tilting portable device 100 using the sensor 173 for detecting tilt. The controller 110 may calculate the direction and angle of the tilting portable device 100 using the tilt detecting sensor 173.

The controller 110 may calculate the angle of the portable device 100 gradually tilting, and store the angle in the storage unit 175.

In step S508 of FIG. 5, the cursor moves corresponding to the direction of the tilting portable device.

Referring to FIGS. 6*e* to 6*h*, corresponding to the direction (or direction and angle) of the portable device 100, the controller 110 may move (to, e.g., 191*a*61, 191*a*62, 191*a*63, or 191*a*64) the current cursor position 191*a*6 displayed on the display region 191*a*.

Upon exceeding a set angle (e.g., its threshold is all, α12, α13, or α14) for one direction of the portable device 100, the controller 110 may move (to 191*a*61, 191*a*62, 191*a*63, or 191*a*64) the current cursor position 191*a*6 displayed on the display region 191*a*.

The set thresholds all, α12, α13, and α14 all may be the same, or only some may differ. The set thresholds all, α12, α13, and α14 all may be the same, or only some may differ, depending on the tilting direction of the portable device 100.

It may be enough that the tilting direction (or direction and angle) of the portable device 100 is a line passing through the center of the portable device 100 or a line passing through the inside of the portable device 100.

Corresponding to the direction (or direction and tilt) of the portable device 100, the controller 110 may gradually move (to, e.g., 191*a*61, 191*a*62, 191*a*63, or 191*a*64) the current cursor position 191*a*6 displayed on the display region 191*a*. For example, when the portable device 100 steadily tilts, the controller 110 may steadily move the current cursor position 191*a*6 displayed on the display region 191*a* corresponding to the direction (or direction and tilt) of the portable device 100 steadily tilting. When the portable device 100 rapidly tilts, the controller 110 may quickly move the current cursor position 191*a*6 displayed on the display region 191*a* corresponding to the direction (or direction and tilt) of the portable device 100 rapidly tilting.

The controller 110 may provide the user with feedback corresponding to the movement of the cursor position by the direction (or direction and angle) of the portable device 100.

The controller 110 may provide one of visual feedback, auditory feedback, and tactile feedback. The controller 110 may provide the user with combinations of visual feedback, auditory feedback, and tactile feedback.

Since the feedback corresponding to the movement of the cursor position by the direction (or direction and angle) of the portable device 100 in step S508 of FIG. 5 is substantially similar to (e.g., differs in function from) the feedback corresponding to the selection of the full text by the direction (or direction and angle) of the portable device 100 in step S506 of FIG. 5, no repetitive description is given.

In step S508 of FIG. 5, when the cursor moves corresponding to the direction of the tilting portable device, the method for controlling the cursor on the portable device is terminated.

The methods according to the embodiments of the present invention may be implemented in the form of programming commands executable by various computer means, and the programming commands may be recorded in a computer-readable medium. The computer-readable medium may include programming commands, data files, or data structures, alone or in combinations thereof. The computer-readable medium may be stored in a volatile or non-volatile storage device such as a read-only memory (ROM) or other storage devices, a memory, such as a random access memory (RAM), a memory chip, a device or an integrated circuit, or a storage medium, such as, e.g., a compact disc (CD), a digital video disc (DVD), a magnetic disk, or a magnetic tape, which allows for optical or magnetic recording while simultaneously read out by a machine (e.g., a computer).

The memory that may be included in the portable device may be an example of a storage medium that may be read out by a machine appropriate to store a program or programs including instructions for realizing the embodiments of the present invention. The programming commands recorded in the medium may be specially designed and configured for the present invention or may be known and available to one of ordinary skill in the computer software-related art.

As such, it should be appreciated that although the present invention has been shown and described in connection with a limited number of embodiments thereof, various changes in form or detail may be made thereto by those skilled in the art.

Thus, the scope of the present invention should not be limited to the above-described embodiments, and should rather be defined by the following claims and equivalents thereof.

The invention claimed is:

1. A method for controlling a cursor on a portable device, the method comprising:

displaying on a display an application screen including an input region having a soft key, and a display region displaying a cursor and a sentence including text, and wherein the text includes one or more words separated by spaces, and each word includes one or more syllables;

detecting a first pressure touch on the input region of the application screen;

displaying a pressure touch region corresponding to the detected first pressure touch in the input region; and based on detecting a continuous movement of the first pressure touch in the pressure touch region, moving the cursor within the text according to the continuous movement, based on the continuous movement of the first pressure touch being detected while a second touch on the pressure touch region in addition to the first pressure touch is maintained:

selecting text for highlight according to the detected continuous movement of the first pressure touch;

detecting a release of the second touch, wherein the selection of the text displayed in highlight is completed upon the release of the second touch; and displaying, in the input region, a function icon selectable to edit the selected text at a position proximate to a location of the first pressure touch when the second touch is released, wherein the function icon includes at least one of a select all icon, a cut icon, a copy icon, a paste icon, and a delete icon.

2. The method of claim 1, wherein based on a direction of the continuous movement of the first pressure touch being an upward direction, a cursor position is moved from a first syllable in a current line to a second syllable in a previous line, and based on the direction of the continuous movement of the first pressure touch being a downward direction, the cursor position is moved from the first syllable in the current line to a third syllable in a next line.

3. The method of claim 1, wherein the application screen further includes a word suggestion region, and wherein a suggested word corresponding to a current cursor position is displayed in the word suggestion region.

4. The method of claim 1, wherein based on a direction of the continuous movement of the second pressure touch being an upward direction, the cursor is moved from a first word in a current line to a second word in a previous line, and based on the direction of the continuous movement of the second pressure touch being a downward direction, a cursor position is moved from the first word of the current line to the second word in a next line.

5. The method of claim 1, further comprising:

detecting selection of one of the displayed function icon by the continuous movement of the first pressure touch; and executing an editing function on the selected text corresponding to the selected function icon.

6. The method of claim 1, further comprising:
detecting a first tab on the pressure touch region displayed corresponding to the detected first pressure touch; and
displaying the text selected in highlight from a current cursor position corresponding to the detected first tab.

7. The method of claim 1, further comprising:
detecting, by a sensor, a direction of a tilt of the portable device while the second touch and the first pressure touch are maintained; and
moving the cursor according to the detected direction of the tilt.

8. The method of claim 1, further comprising:
detecting, by a sensor, shaking of the portable device; and
copying the text selected in highlight in response to detecting the shaking.

9. The method of claim 1, the method further comprising:
based on detecting a second pressure touch to the pressure touch region, the second pressure touch dragged along a surface of the display to trace a predefined shape, executing an editing function preassociated with the predefined shape.

10. A portable device, comprising:
a pressure sensor;
a touchscreen configured to display an application screen; and
a processor configured to control the pressure sensor and the touchscreen, wherein the processor is configured to perform control to:
display on the touchscreen an application screen including an input region having a soft key, and a display region displaying a cursor and a sentence including text, and wherein the text includes one or more words separated by spaces, and each word includes one or more syllables,
detect a first pressure touch on the input region using the pressure sensor,
display a pressure touch region corresponding to the detected first pressure touch in the input region,
based on detecting a continuous movement of the first pressure touch in the pressure touch, move the cursor within the text according to the continuous movement,
based on the continuous movement of the first pressure touch being detected while a second touch on the pressure touch region in addition to the first pressure touch is maintained:
select text for highlight according to the detected continuous movement of the first pressure touch,
detect a release of the second touch, wherein the selection of the text displayed in highlight is completed upon the release of the second touch,
and
display, in the input region, a function icon selectable to edit the selected text at a position proximate to a location of the first pressure touch when the second touch is released,
wherein the function icon includes at least one of a select all icon, a cut icon, a copy icon, a paste icon, and a delete icon.

11. The portable device of claim 10, wherein the processor is configured to control to:
detect, in addition to the first pressure touch, a second touch on the touchscreen, and
select a portion of the text in highlight based on the continuous movement of the first pressure touch while the second touch is maintained.

12. The portable device of claim 10, further comprising a sensor configured to detect a tilt of the portable device, wherein the processor is configured to control to:
detect, in addition to the first pressure touch, a second touch on the touchscreen, and
change a cursor position corresponding to a tilt direction of the portable device while the second touch is maintained.

13. The portable device of claim 11, further comprising a motion sensor configured to detect shaking of the portable device, wherein the processor is configured to control to:
detect, in addition to the first pressure touch, a second touch on the touchscreen, and
copy the portion of the text selected in highlight based on detecting shaking of the portable device.

14. The portable device of claim 10, wherein based on a direction of the continuous movement of the second pressure touch being an upward direction, the cursor is moved from a first word in a current line to a second word in a previous line, and based on the direction of the continuous movement of the second pressure touch being a downward direction, a cursor position is moved from the first word of the current line to the second word in the next line.

15. The portable device of claim 10, based on detecting a second pressure touch to the pressure touch region, the second pressure touch dragged along a surface of the display to trace a predefined shape, the processor is configured to execute an editing function preassociated with the predefined shape.

* * * * *